(12) United States Patent
Pruitt

(10) Patent No.: US 12,527,358 B2
(45) Date of Patent: Jan. 20, 2026

(54) SYSTEM, METHOD AND DEVICE FOR AGE AUTHENTICATED VAPING

(71) Applicant: Joseph William Pruitt, Athens, GA (US)

(72) Inventor: Joseph William Pruitt, Athens, GA (US)

( * ) Notice: Subject to any disclaimer, the term of this patent is extended or adjusted under 35 U.S.C. 154(b) by 0 days.

(21) Appl. No.: 19/011,045

(22) Filed: Jan. 6, 2025

(65) Prior Publication Data

US 2025/0143377 A1    May 8, 2025

Related U.S. Application Data

(60) Provisional application No. 63/596,339, filed on Nov. 6, 2023.

(51) Int. Cl.
| | | |
|---|---|---|
| *A24F 40/10* | (2020.01) | |
| *A24F 40/51* | (2020.01) | |
| *A24F 40/60* | (2020.01) | |
| *G06F 21/32* | (2013.01) | |

(52) U.S. Cl.
CPC ............... *A24F 40/51* (2020.01); *A24F 40/10* (2020.01); *A24F 40/60* (2020.01); *G06F 21/32* (2013.01)

(58) Field of Classification Search
CPC .......... A24F 40/51; A24F 40/10; A24F 40/60; G06F 21/32; G06F 21/44; G06Q 20/327
See application file for complete search history.

(56) References Cited

U.S. PATENT DOCUMENTS

| | | |
|---|---|---|
| 11,000,076 B2 | 5/2021 | Tremblay |
| 11,200,770 B2 | 12/2021 | Hubbard |
| 11,676,438 B2 | 6/2023 | Hubbard |
| 11,842,347 B2 | 12/2023 | Keen |
| 11,880,438 B2 | 1/2024 | Sweeney |
| 11,886,952 B2 | 1/2024 | Sweeney |

(Continued)

FOREIGN PATENT DOCUMENTS

| | | |
|---|---|---|
| AU | 2020234112 A1 | 9/2021 |
| AU | 2020256187 A1 | 10/2021 |

(Continued)

OTHER PUBLICATIONS

U.S. Appl. No. 17/619,002, filed Nov. 14, 2024, Chen Chen.
U.S. Appl. No. 17/523,881, filed Aug. 11, 2022, Ronald Eric Tobb.

*Primary Examiner* — Vernal U Brown
(74) *Attorney, Agent, or Firm* — Smith Tempel Blaha LLC; Matthew T. Hoots

(57) ABSTRACT

A personal vaping device ("PVD") for age authenticated vaping is configured to read the thumbprint of an active user of the vaping device and, essentially simultaneously, perform a bioimpedance analysis ("BIA") to measure a bioimpedance signature of the active user. The combination of the user's thumbprint with the bioimpedance signature defines a unique identity data combination for the user that can be compared to stored identity data combinations of authorized users. If the identity data combination of the active user matches, within a statistical confidence level, a stored identity data combination of an authorized user, the vaping device "unlocks" its heating chamber such that power is supplied to the coil/heating element for vaporizing e-juice.

21 Claims, 20 Drawing Sheets

(56) References Cited

U.S. PATENT DOCUMENTS

| | | | |
|---|---|---|---|
| 11,930,856 | B2 | 3/2024 | Janardhan |
| 11,935,350 | B2 | 3/2024 | Hubbard |
| 11,952,260 | B2 | 4/2024 | Setchell |
| 11,989,990 | B2 | 5/2024 | Hubbard |
| 12,035,756 | B2 | 7/2024 | Fard |
| 12,087,117 | B2 | 9/2024 | Hubbard |
| 12,128,181 | B2 | 10/2024 | Cazzoli |
| 2018/0276440 | A1* | 9/2018 | Strohmann ........ G06V 40/1359 |
| 2020/0342086 | A1* | 10/2020 | Oung .................. H04W 12/065 |
| 2021/0135760 | A1 | 5/2021 | Abe et al. |
| 2021/0209204 | A1 | 7/2021 | Flokos |
| 2021/0251297 | A1 | 8/2021 | Qiu |
| 2021/0298363 | A1* | 9/2021 | Daugherty .............. A24F 40/60 |
| 2021/0350374 | A1 | 11/2021 | Keen |
| 2022/0004605 | A1 | 1/2022 | Sweeney |
| 2022/0075860 | A1 | 3/2022 | Fujioka |
| 2022/0101675 | A1 | 3/2022 | Hubbard |
| 2022/0211115 | A1 | 7/2022 | Janardhan |
| 2022/0342971 | A1 | 10/2022 | Lin |
| 2023/0025261 | A1* | 1/2023 | Bouchuiguir ........... A24F 40/53 |
| 2023/0045092 | A1 | 2/2023 | Tremblay |
| 2023/0274596 | A1 | 8/2023 | Hubbard |
| 2024/0037619 | A1 | 2/2024 | Hubbard |
| 2024/0046728 | A1 | 2/2024 | Hubbard |
| 2024/0126282 | A1 | 4/2024 | Fujioka |
| 2024/0311455 | A1 | 9/2024 | Sweeney |
| 2024/0346501 | A1 | 10/2024 | Taylor |

FOREIGN PATENT DOCUMENTS

| | | | | |
|---|---|---|---|---|
| AU | 2020261046 | A1 | 11/2021 | |
| AU | 2020279887 | A1 | 12/2021 | |
| CA | 3172081 | A1 | 11/2021 | |
| CA | 3135791 | C | 2/2023 | |
| CA | 3020139 | C | 7/2023 | |
| CA | 3135789 | C | 8/2023 | |
| CN | 112714141 | A | 4/2021 | |
| CN | 113924015 | A | 1/2022 | |
| CN | 114127769 | A | 3/2022 | |
| CN | 114144086 | A | 3/2022 | |
| CN | 114206419 | A | 3/2022 | |
| CN | 115021901 | A | 9/2022 | |
| CN | 115715394 | A | 2/2023 | |
| CN | 110754702 | B | 3/2023 | |
| CN | 115758305 | A | 3/2023 | |
| CN | 116325014 | A | 6/2023 | |
| CN | 116649646 | A | 8/2023 | |
| CN | 111460417 | B | 1/2024 | |
| CN | 112712373 | B | 2/2024 | |
| EP | 3738524 | A1 | 1/2021 | |
| EP | 3772001 | A1 | 2/2021 | |
| EP | 3868091 | A1 | 8/2021 | |
| EP | 3874978 | A1 | 9/2021 | |
| EP | 4079176 | A1 | 10/2022 | |
| EP | 4399986 | A2 | 7/2024 | |
| EP | 4401443 | A2 | 7/2024 | |
| EP | 4149300 | B1 | 11/2024 | |
| JP | 2021508457 | A | 3/2021 | |
| JP | 2022526444 | A | 5/2022 | |
| JP | 2022531148 | A | 7/2022 | |
| JP | 2022532676 | A | 7/2022 | |
| JP | 7169466 | B2 | 11/2022 | |
| JP | 2023027338 | A | 3/2023 | |
| JP | 2023139246 | A | 10/2023 | |
| JP | 2024512423 | A | 3/2024 | |
| KR | 102222248 | B1 | 3/2021 | |
| KR | 20210136153 | A | 11/2021 | |
| KR | 20210137579 | A | 11/2021 | |
| KR | 20210145795 | A | 12/2021 | |
| KR | 20220004824 | A | 1/2022 | |
| KR | 20220009412 | A | 1/2022 | |
| KR | 102502700 | B1 | 2/2023 | |
| KR | 20230030026 | A | 3/2023 | |
| KR | 20230084601 | A | 6/2023 | |
| KR | 20230118011 | A | 8/2023 | |
| WO | WO2021139407 | A1 | 7/2021 | |
| WO | WO2021190119 | A1 | 9/2021 | |
| WO | WO2021225689 | A1 | 11/2021 | |
| WO | WO2020205972 | A9 | 1/2022 | |
| WO | WO 2022/058320 | * | 3/2022 | ............ A24F 40/51 |
| WO | WO-2022058320 | A1 * | 3/2022 | ............ A24F 40/51 |
| WO | WO2022189796 | A1 | 9/2022 | |

\* cited by examiner

Digital image of the fingerprint pattern    Distinguishing features of the fingerprint    Digital template of the fingerprint

155

155

Green means fingerprint is approved.
 Red means fingerprint is rejected.

155

SYSTEM, METHOD AND DEVICE FOR AGE AUTHENTICATED VAPING

CROSS-REFERENCE TO RELATED APPLICATIONS

Priority under 35 U.S.C. § 119(e) is claimed to the U.S. provisional application entitled "SECURITY FEATURES FOR AN ELECTRONIC VAPOR INHALATION SYSTEM," filed on Nov. 6, 2023, and assigned application Ser. No. 63/596,339, the entire contents of which are hereby incorporated by reference.

BACKGROUND

The present invention relates to systems, methods, and devices for vaping and, more particularly, to a novel system and method for authenticating a given user to use a personal vaping device.

Vaping devices have become increasingly popular as an alternative to traditional smoking. These devices vaporize a nicotine-infused liquid or other similar vapor liquid products (often called "e-juice"), allowing users to inhale the vapor. The main components of a vaping device known in the art include a battery, an outer body, an electronic circuit, and a pod housing that contains the liquid, heating element, and electrical connection contact points. The pod is designed to be inserted into the main body of the device, where it is connected to the battery and heating element to vaporize the liquid for inhalation by a user.

The current technology in the vaping device market primarily involves the use of a pod system, where the liquid is stored in a replaceable pod that can be easily inserted and removed from the main device. The pods are typically designed to be disposable, with the user simply replacing the entire pod when the liquid runs out. The main device itself is reusable, with the battery and electronic circuit being designed to last for multiple pods.

Despite the popularity of vaping devices, there are several problems and limitations associated with the current technology. One of the main issues is regulating underage users of vaping devices. Current technology for vaping devices known in the art has sought to address the problem of underage vaping device users without much success. That is, technology known in the art either requires an authorized user of a given personal vaping device to repeatedly reauthenticate an age/identity and/or presents opportunities for "work arounds" that allow for clever underage (i.e., unauthorized) users to take control of, and use, the personal vaping device. Notably, because current vaping technology has fallen short in consistently and conveniently verifying a vape device user's age and identity, and therefore has failed to ensure that only "of age" users may vape, the industry has sought to curb underage use of vape devices by offering e-juice options that generally don't appeal to underage users (e.g., "candy" flavors and "fruit" flavors).

While limiting e-juice offerings to flavors that generally don't appeal to underage vape users has probably stemmed the population of underage vape device users, doing so is an imperfect solution because 1) some underage vape device users still vape despite not having a legal source for "fruit" or "candy" flavored e-juice, and 2) of age, legal vape device users who want to vape "fruit" or "candy" flavored e-juice are denied access to a product they desire. It seems clear that the solution to underage vaping is not limiting e-juice offerings but, rather, providing a smart personal vaping device that verifies the authorization of a vape user each time the user seeks to inhale vapor. Therefore, there is a need in the art for a personal vaping device/authentication method and system that the shortcomings in the current technology outlined above.

SUMMARY

Exemplary embodiments of a personal vaping device ("PVD") for age authenticated vaping are disclosed. Certain embodiments are configured to read the thumbprint of an active user of the vaping device and, essentially simultaneously, perform a bioimpedance analysis ("BIA") to measure a bioimpedance signature of the active user. The combination of the user's thumbprint with the bioimpedance signature defines a unique identity data combination for the user that can be compared to stored identity data combinations of authorized users. If the identity data combination of the active user matches, within a statistical confidence level, a stored identity data combination of an authorized user, the vaping device "unlocks" its heating chamber such that power is supplied to the coil/heating element for vaporizing e-juice. Advantageously, the 2-step authentication process happens instantaneously when an authorized user holds the vaping device with a thumb on a thumb reader of the vaping device and a lip on a mouthpiece of the vaping device. First and second BIA sensors may be physically associated with the thumb reader and the mouthpiece such that a low voltage circuit is created through the user's body, as would be understood by one of ordinary skill in the art of bioimpedance analysis.

Once the PVD is configured to recognize any one of one or more authenticated users of the vaping device, based on the unique identity data combinations of the authorized users, an exemplary method for "unlocking" the vaping device such that the coil is energized to vaporize e-juice comprises reading a thumbprint and measuring a bioimpedance signature to define an identity data combination for an active user of a vaping device. Based on the identity data combination for the active user of the vaping device, the method determines whether the active user is an authorized user of the vaping device and, if so, unlocks the heating chamber such that power is supplied to a coil operable to vaporize e-juice.

Determining that the active user of the vaping device is an authorized user of the vaping device comprises comparing the identity data combination of the active user with one or more stored identity data combinations associated with authorized users of the vaping device. The comparison of an identity data combination for an active user to stored identity data combination(s) of authorized user(s) may include calculating within a statistical confidence interval that the identity data combination of the active user is equivalent to a stored identity combination associated with an authorized user. The reason that an exact match of identity data combinations may not be necessary in preferred embodiments in order to determine that an active user is an authorized user is because BIA signatures for a given user may vary over time depending on any one or more factors including, but not limited to, variations in body mass composition, hydration, physical exertion, dietary intake, etc., as would be understood by one of ordinary skill in the art of BIA. As such, it is envisioned that some embodiments of the solution may from time to time update a bioimpedance signature stored in association with an authorized user.

So that the PVD may unlock seamlessly, and without noticeable delay to an active user, it is envisioned that preferred embodiments will essentially read the active user's thumbprint simultaneously with performing the BIA and measuring the resulting bioimpedance signature. If the identity data combination of the active user matches a stored identity data combination of an authorized user, the heating chamber is energized to generate vapor. By contrast, if the identity data combination of an active user does not match any stored identity data combination associated with an authorized user, the heating chamber remains "locked" and deenergized such that no vapor is produced.

An alternative embodiment of the inventive solution is in the form of a personal vaping device configured to perform the novel methodology for age authenticated vaping. The PVD according to the solution may comprise a heating coil, a thumbprint reader, a BIA subsystem, and an authenticator engine. The BIA subsystem may comprise first and second bioimpedance sensors such that the subsystem may measure a bioimpedance signature when a thumb of an active user of the vaping device is in contact with the first of the bioimpedance sensors and a lip of the active user of the vaping device is in contact with the second of the bioimpedance sensors. The authenticator engine is configured to compare an identity data combination associated with an active user of the vaping device with one or more stored identity data combinations associated with authorized users of the vaping device. If the authenticator engine determines that an identity data combination for an active user of the vaping device is statistically equivalent (i.e., within a predetermined confidence level) to one of the one or more identity data combinations associated with authorized users of the vaping device, power is supplied to the coil.

Another alternative embodiment of the inventive solution is in the form of a computer program product comprising a computer usable medium having a computer readable program code embodied therein, said computer readable program code adapted to be executed to implement a method for age authenticated vaping in a personal vaping device. The computer usable medium may be memory embedded within the PVD on a printed circuit board or the like. A processor(s) in communication with the memory executes the program code in order to implement the method for age authenticated vaping, thereby ensuring that only an authenticated user of the PVD may effectively use the PVD.

DETAILED DESCRIPTION

Figures 1A, 1B:
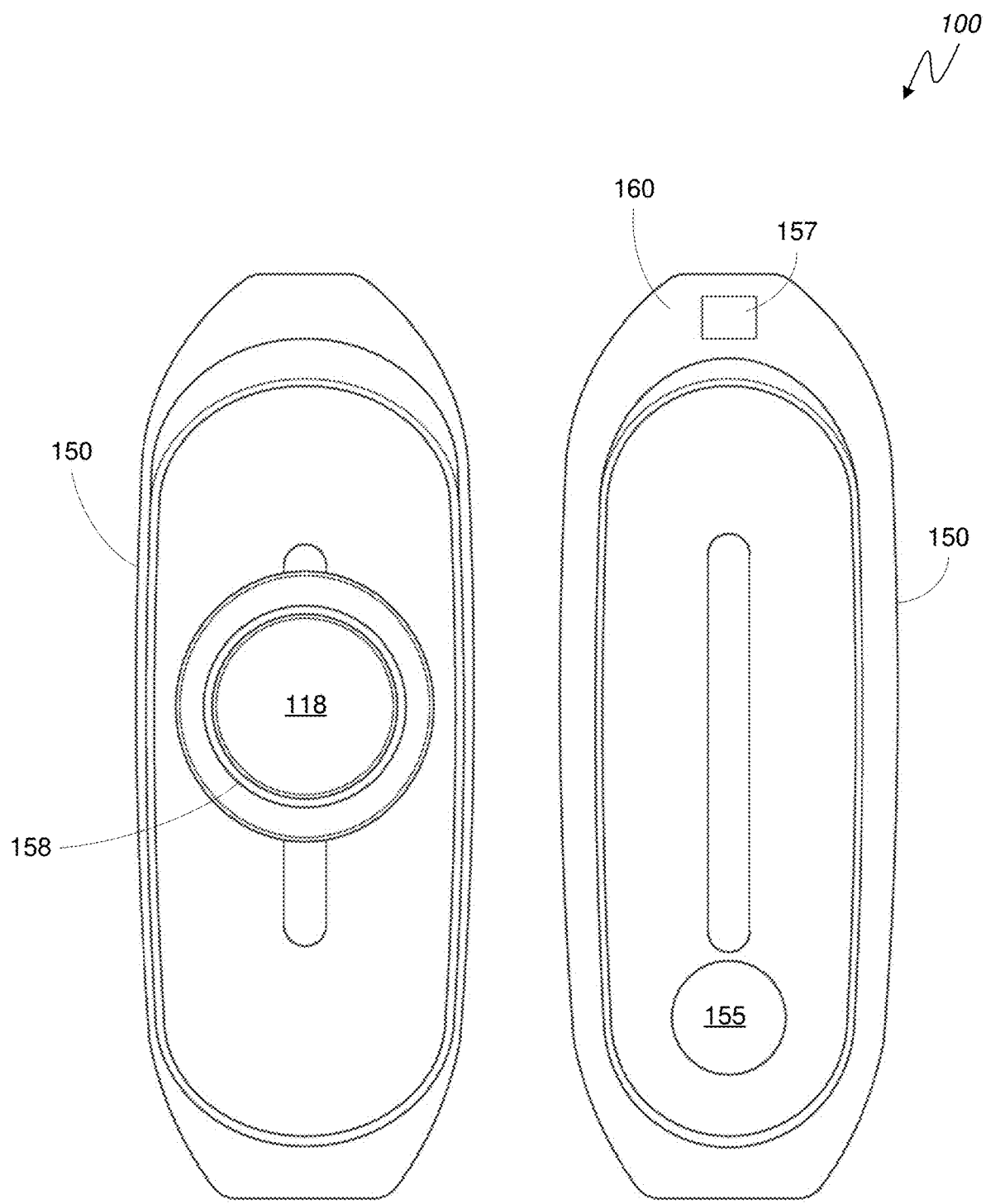
FIGS. 1A and 1B illustrate bottom and top views, respectively, of an exemplary personal vaping device ("PVD") according to the solution.

Various embodiments, aspects and features of the present invention encompass a system, method, and personal vaping device ("PVD") 100 for age authenticated vaping. With reference to the figures, embodiments of the solution may be configured to recognize a particular, authorized PVD user and, as such, advantageously prevent underage, unauthorized users from inhaling vapor using the PVD.

The word "exemplary" is used herein to mean "serving as an example, instance, or illustration." Any aspect described herein as "exemplary" is not necessarily to be construed as exclusive, preferred or advantageous over other aspects.

In this description, it will be understood by those of ordinary skill in the art of microelectronics that various one or more components of the solution may "run" or "execute" a software application. As such, one of ordinary skill in the art will understand that the term "application" may include files having executable content, such as: object code, scripts, byte code, markup language files, and patches. In addition, an "application" may also include files that are not executable in nature, such as documents that may need to be opened or other data files that need to be accessed (such as, for example, a PVD user's fingerprint data).

As used in this description, the terms "component," "database," "module," "system," "generator," "processing component," "engine," "application processor" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a personal computing device and the computing device may be a component of the overall system for age authenticated vaping. One or more components may reside within a process and/or thread of execution, and a component may be localized on one device and/or distributed between two or more devices. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "application processor ("AP")," "processor," "chip" and "chipset" are non-limiting examples of processing components that may reside in a PCD or Server or PVD and are used interchangeably except when otherwise indicated. Moreover, as distinguished in this description, a CPU, DSP, AP or a chip or chipset may be comprised of one or more distinct processing components generally referred to herein as "core(s)." For simplicity, all processing components that may be leveraged in a given embodiment of the solution are not necessarily illustrated in the figures; however, one of ordinary skill in the art will recognize that any one or more of the components, engines, generators, etc. that are illustrated may include one or more chips and memory.

In this description, reference to "memory" and the like refers to a broader class of non-volatile (i.e., retains its data after power is removed) programmable memory and will not limit the scope of the solutions disclosed. As such, it will be understood that use of the terms envisions any programmable read-only memory or field programmable non-volatile memory suitable for a given application of a solution such as, but not limited to, embedded multimedia card ("eMMC") memory, EEPROM, flash memory, etc.

In this description, the term "portable computing device" ("PCD") is used to describe any device operating on a limited capacity power supply, such as a battery, and associated with or accessible by a user of a PVD. It will be understood, therefore, that a PCD may be a cellular telephone, a satellite telephone, a pager, a PDA, a smartphone, a navigation device, a tablet, a smartbook or reader, a media player, a combination of the aforementioned devices, a laptop computer with a wireless connection, among others.

In this description, the term "personal vaping device" ("PVD") refers to a vaping device according to the solution and operable to be configured to authenticate a user before vaporizing e-juice. A PVD may be configured to authenticate a user by the exemplary provisioning methods described in this description; however, it is envisioned that modifications or variations of the provisioning methods will occur to those of skill in the art reviewing the present disclosure and figures. As will become clear from the description and figures that follow, a PVD will, inter alia, associate an "of age" user's fingerprint (or thumbprint) with a bioimpedance signature unique to the user, such that the PVD will not vaporize e-juice absent a confirmed combination of the authenticated user's fingerprint and BIA signature.

In this description, the term "Bioimpedance Generator" refers to a component or module within a PVD that works with an application processor and memory (or may include its own, dedicated processor and memory) to generate and measure a BIA signal unique to the user. As would be understood by one of ordinary skill in the art, BIA is an established and safe method for estimating a user's body composition as it is comprised of body fat and muscle mass. The Bioimpedance Generator may cause a weak electric current to flow through the body of a PVD user such that a circuit is completed from the PVD mouthpiece (a first sensor) to the PVD body (a second sensor). With the circuit complete, the voltage is measured in order to calculate impedance (resistance and reactance) of the PVD user's body, as would be understood by one of ordinary skill in the art of bioimpedance analysis. Notably, although it is envisioned that preferred embodiments of the solution may leverage a bioimpedance analysis in a PVD, it is further envisioned that a two-step authentication of an "of age" user (fingerprint and BIA signal) may leverage other technology capable of generating a signal/reading unique to a given user such as, for example, multifrequency bioelectrical impedance. Notably, the accuracy of a BIA reading to estimate a PVD user's actual body fat/muscle mass ratio is not as critical for successful employment of embodiments of the solution as generation of a consistent reading within an acceptable error range.

In this description, the term "Authenticator Engine" refers to a component or module within a PVD that works with an application processor and memory (or may include its own, dedicated processor and memory) to recognize and store a thumbprint of a PVD user whose age has been verified to meet or exceed a predefined age. Moreover, once the PVD is successfully configured/provisioned to be operable for vaporizing e-juice when used by a given age-verified, authenticated user, the Authenticator Engine may be responsible for verifying a currently read thumbprint matches a stored thumbprint and that a BIA signal measured by the Bioimpedance Generator is within an acceptable range of a stored BIA signal reference point that is associated with the user. If the actively read thumbprint and measured BIA combination matches with a stored combination of a thumbprint and BIA signal, within an acceptable degree of error, the Authenticator Engine may "unlock" the PVD's heating chamber/coil such that e-juice may be vaporized for inhalation.

In this description, the terms "thumbprint" and "fingerprint" are used interchangeably. It will be understood that embodiments of the solution are not limited to specifically leveraging a PVD user's thumbprint or fingerprint.

In this description, "AI Age Engine" refers to a component that works with application processor(s) (often distributed across the "cloud") and images stored in memory in association with, and/or accessible by, the application processor(s) in order to compute, with some degree of certainty, the age of a PVD user who has provided the AI Age Engine with a picture of himself. Embodiments of the solution don't necessarily leverage an AI Age Engine; however, it is envisioned that use of an AI Age Engine may streamline steps for determining/verifying a PVD user's age to be above a predetermined, acceptable age such that a capture of the PVD's user's government provided identification card (such as a driver's license), and query of same, becomes unnecessary to confirm that the PVD user is "of age."

In this description, "Age Authentication Engine" refers to a component that works with application processor(s) (often distributed across the "cloud") to "read" a PVD user provided image capture of a government issued identification such as, for example, a driver's license. Depending on embodiment, the Age Authentication Engine may simply "read" data from the PVD user provided capture to verify age while, in some embodiments, the Age Authentication Engine may communicate with third party databases such as, for example, Department of Motor Vehicle databases, to verify the authenticity of a PVD user provided government issued ID.

In this description, the term "e-juice" is used to refer to any liquid, oil, dry herb, or wax suitable for being vaporized by a personal vaping device.

With reference to the figure illustrations, a personal vaping device ("PVD") 100 according to the solution may include a main device body 110 and a reusable pod. FIGS. 1A and 1B illustrate bottom and top views, respectively, of the exemplary PVD 100 according to the solution. The main device body may comprise an internal battery 188 (shown in FIG. 2), an outer body 150, an electronic integrated circuit ("PCB") 102, and first and second BIA electrical contacts 157, 158. The outer body 150 may be made of a durable plastic or alloy material, such as polycarbonate or aluminum. The internal battery 188 may have a capacity of 400 mAh and may be charged via a USB-C port, or other connection port type, located on the outer body 150 (not illustrated in the figures) and may be controlled by a dedicated power management integrated circuit 187 (shown in FIG. 2).

The mouthpiece portion 160 (which may be comprised within a separable pod) may be made of food-grade plastic material and feature a small opening for the user to touch their mouth to the mouthpiece with that opening and inhale. As will become clearer from the illustrations and figures that follow, however, it is an advantage of a PVD 100 according to the solution that the PVD 100 will not vaporize e-juice from the pod unless and until the user is verified to be an authenticated user. The mouthpiece 160 may include a first BIA sensor 157, while the main body 150 may include a second BIA sensor 158 associated with and/or around a thumbprint reader 118. The main body 150 may also include a display 155, such as an LCD display, configured to present feedback to a PVD user such as, for example, "go/no-go" images, thumbprint images, QR codes or other unique codes, etc. The novel use of the various components of the PVD 100, such as the BIA sensors and the thumbprint reader 118 will become apparent from a review of subsequent figures and disclosure.

An e-juice pod that couples to the main device body 150 may comprise a magnet or multiple magnets, multiple contact points for electrical signals and power to flow from the body 150 to the pod, and a mechanical interlocking system. The magnet(s) may be a neodymium magnet with a strength of about 1000 Gauss. The multiple contact points may include a positive terminal, a negative terminal, and one or two signal terminals. The mechanical interlocking system may comprise several detents in the main body 150 with corresponding protrusion features in the pod that interact and align with the body detent features when the pod is installed on to the main body 150. A liquid level indicator, if included, may be part of the PCB 102 coupled to several embedded contact points within the pod.

Advantageously, the ergonomic design of the PVD 100 may allow it to fit inside a user's pocket. The main device body 150 of the exemplary embodiment illustrated in the figures has an oblong shape with a cross-section of about 35 mm×15 mm and a height of about 75 mm. The pod (not separately shown from the body 150) has a similar cross-sectional shape and size of the end of the main body 150, with a height of 25 mm.

In use, the PVD user places his mouth on the mouthpiece 160 of the PVD 100 while holding the PVD 100 such that 1) the user's thumb is simultaneously in contact with the thumbprint reader 118 and the second BIA sensor 158, and 2) the user's mouth is in contact with the first BIA sensor 157. As will become clearer from the illustrations and description that follows, the PVD 100 may then verify that the PVD user is authorized to use the PVD 100 by confirming the combination of the PVD user's thumbprint and BIA signature is an authorized combination. If the combination is confirmed, the PVD device 100 may activate the coil/heating chamber 119 such that vapor may be generated by the device 100 and drawn into the PVD user's mouth through the mouthpiece 160. Notably, it is an advantage of the solution that a PVD device 100 may be configured to automatically turn on and off from making vapor in real time, instantly, as the user inhales and then stops inhaling as the PVD may be configured to sense the inhalation of the user and activate or deactivate the heating coil accordingly.

Figure 2:
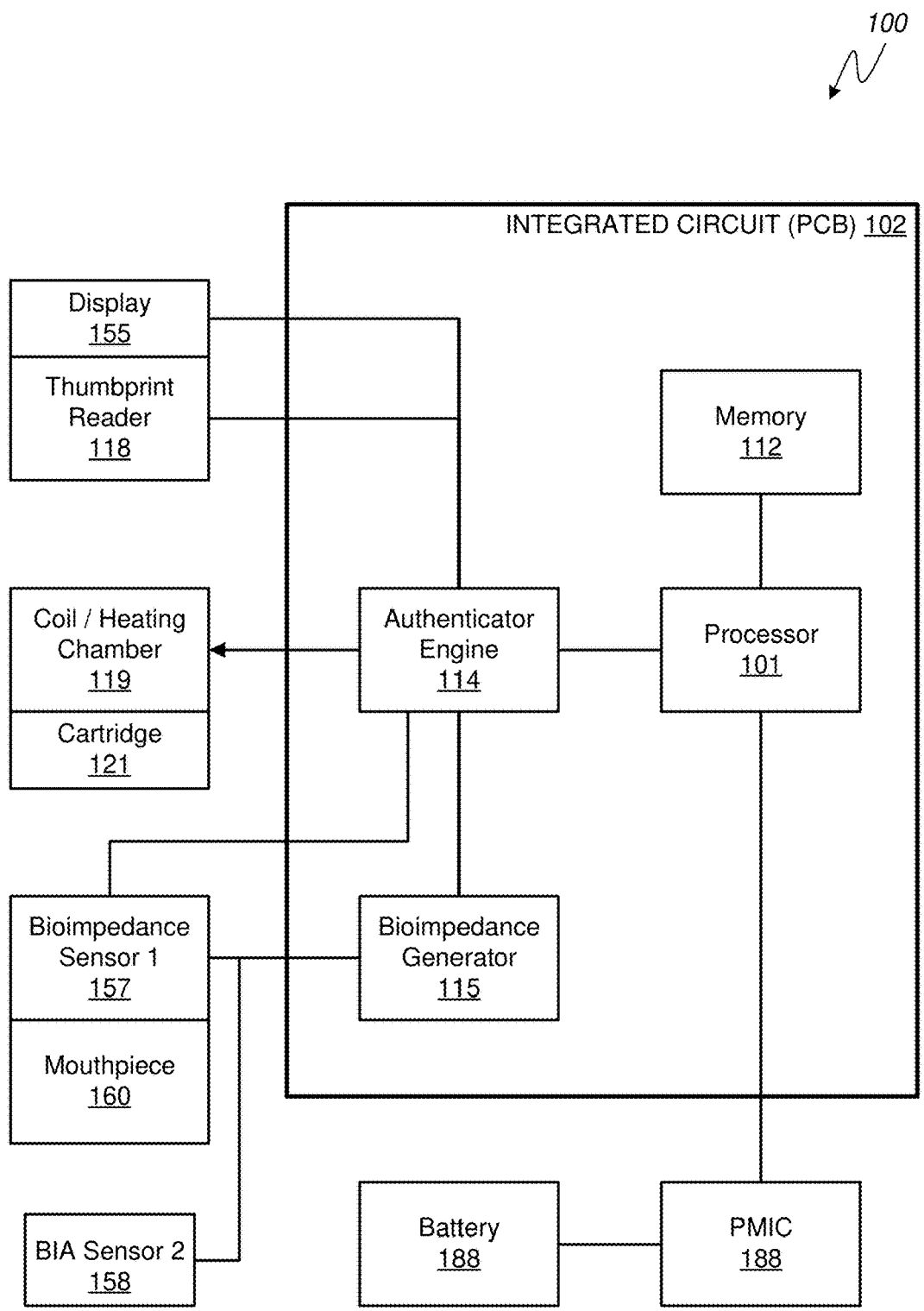
FIG. 2 is a functional block diagram of certain components of an exemplary personal vaping device according to the solution.

FIG. 2 is a functional block diagram of certain components of an exemplary PVD 100 according to the solution. Certain components illustrated in FIG. 2 have been previously described relative to the definitions above and the FIG. 1 illustration. A description of FIG. 2 will be provided to more comprehensively describe key components, and functionalities, of exemplary embodiments of the solution for a PVD. Notably, not all components shown and described are necessarily required in all embodiments of the solution for a PVD configured for age authenticated vaping.

A PCB 102 comprised within the PVD 100 may include, among other components, an authenticator engine 114, a bioimpedance generator 115, a processor 101, and a memory 112. The PCB 102 is powered by a battery 188 that may be controlled by a PMIC 187. Once the PVD 100 is configured to recognize an authenticated user, as described in more detail elsewhere in this disclosure, the authenticator engine 114, working in conjunction with the bioimpedance generator 115, may compare a user's thumbprint with a bioimpedance signature associated with the user to verify that the user has been previously authenticated for use of the PVD 100. If the thumbprint/bioimpedance combination is verified, the authenticator engine 114, working with the PMIC 187, may allow power from the battery 188 to energize the coil/heating chamber 119 in order to vaporize e-juice stored in the cartridge/pod 121. The coil 119 may be a 1.2 ohm coil made of Kanthal wire or, in another embodiment, the heating element may be made from a ceramic coil.

The thumbprint reader 118 may be operable to scan a user's thumbprint such that the authenticator engine 114 may convert the thumbprint to a machine readable, binary code that is stored in the memory 112. The display 155 may be leveraged to give a user visual feedback when the user's thumbprint is successfully (or unsuccessfully, as the case may be) read. With a user's thumbprint recorded in the memory 112, the PVD 100 may later query the recorded thumbprint for comparison to the thumbprint of an active user of the PVD 100.

The bioimpedance generator 115 may generate a relatively weak alternating current (e.g., 3V at a frequency of 1 kHz) that travels through the PVD user's body from the user's mouth (in contact with BIA sensor 157) to the user's thumb (in contact with BIA sensor 158), or vice versa. The bioimpedance generator 115, working with the authenticator engine 114, may be set to recognize a return BIA signal or signature within a range of 0.5V and 3V, and within a frequency of 0.5 kHz to 1 kHz. As would be understood by one of ordinary skill in the art of BIA analysis, the expected voltage drop from the generated 3V to a lower voltage between 3V and 0.5V correlates to a natural impedance of the PVD user's body.

It is envisioned that certain embodiments of the solution will accommodate fluctuations in a PVD user's body mass over time, so as not to generate "false negative" combinations of thumbprints and BIA signatures. Recognizing that a BIA return signal varies according to a user's body mass, and further recognizing that a user's body mass may vary over time, it is envisioned that certain embodiments of the solution may calculate and track a running average of a user's BIA signature such that the target BIA signature is adjusted with each use of the PVD 100. In this way, fluctuations in a user's body mass over time will not cause the authenticator engine 114 to conclude that the user's thumbprint and BIA signature combination is unauthorized.

Figure 3:
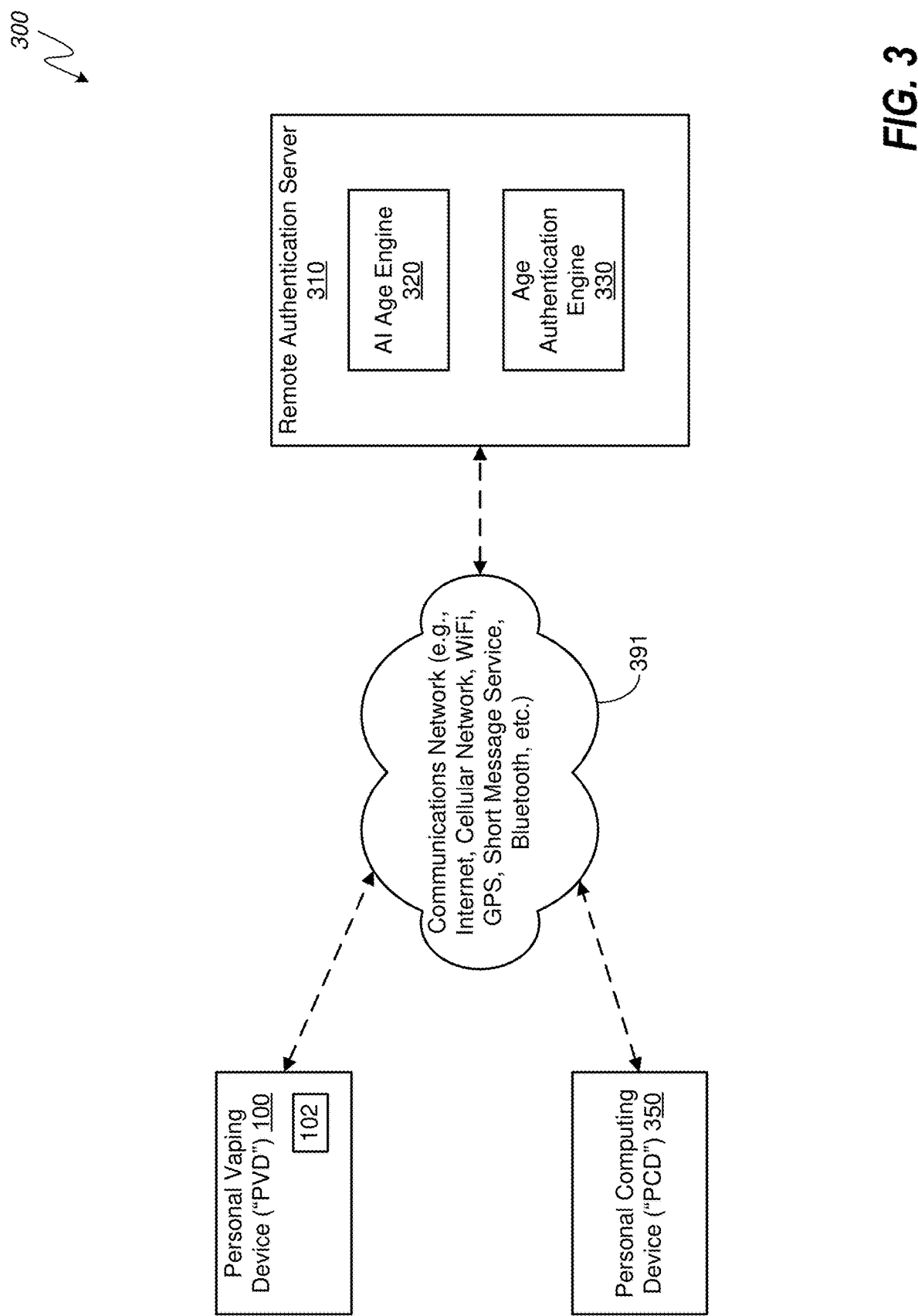
FIG. 3 is a high-level illustration of a system operable to verify the age of a PVD user and configure the PVD to authenticate the identity of the PVD user before vaporizing e-juice.

FIG. 3 is a high-level illustration of a system 300 operable to verify the age of a PVD user and configure the PVD 100 to authenticate the identity of the PVD user before vaporizing e-juice. In the system 300, a PVD 100 and a personal computing device ("PCD") 350 and a remote authentication server 310 are in communication by and through a communications network 391. When initially configuring the PVD 100 to recognize a given "of age" user, the PVD 100 and PCD 350 may work with the remote authentication server 310 to implement one or more of the methods and submethods described in subsequent figures. The remote authentication server 310 may include an AI Age Engine 320 operable to leverage artificial intelligence algorithms and services to determine from a candidate PVD user's picture whether the candidate PVD user is at least of a certain, predefined age. Advantageously, for embodiments of the solution that leverage an AI age engine 320, it may be possible to authorize a candidate PVD user without requiring the candidate PVD user to produce a government issued form of ID.

The remote authentication server 310 may further include an age authentication engine 330 configured to use an image of a government issued ID to verify a candidate PVD user's age and identity. The age authentication engine 330 may work with the AI age engine to verify that a candidate PVD user appearing in a "selfie" image is one and the same as the person identified in a government issued ID. Notably, while the remote authentication server 310 may temporarily store data associated with a candidate PVD user, such as the user's facial image and/or a scan of the user's government issued ID, it is envisioned that preferred embodiments of the solution will delete personal data from the remote authentication server 310 (and/or memory accessible by the remote authentication server 310) once a candidate PVD user is authorized (or declined authorization, as the case may be) and a PVD 100 is configured to vaporize e-juice when used by the authorized PVD user (formerly, the candidate PVD user).

Figure 4:
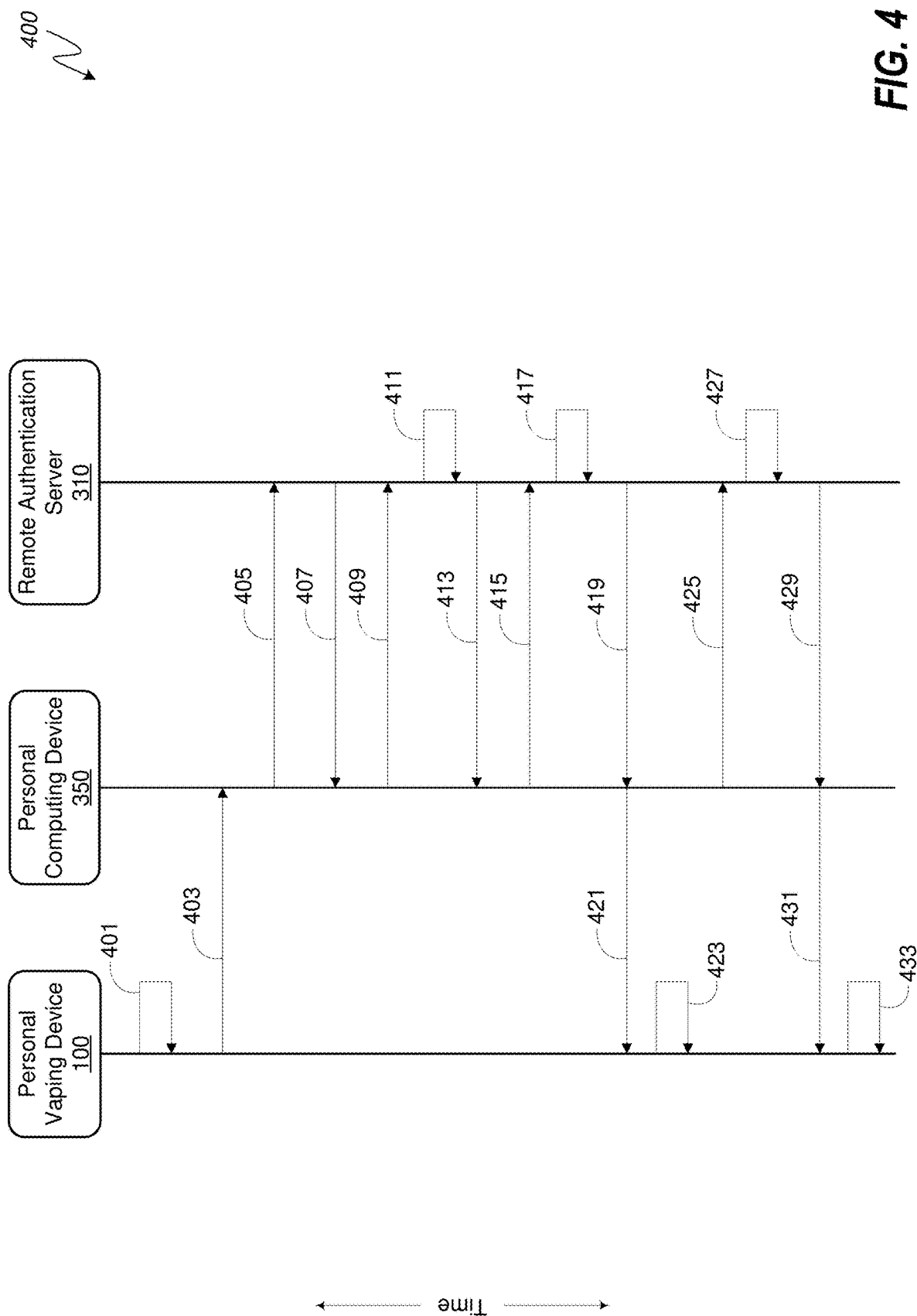
FIG. 4 is a sequence diagram illustrating an exemplary embodiment of a method for configuring a PVD for age authenticated vaping according to the solution.

FIG. 4 is a sequence diagram 400 illustrating an exemplary embodiment of a method for configuring a PVD for age authenticated vaping according to the solution. The FIG. 4 sequence will be described with reference to the various components shown and described in the FIGS. 2 and 3 illustrations. Beginning at action 401, using the thumbprint reader 118, the PVD 100 may digitize and record the thumbprint of a candidate PVD user in memory 112. The PVD 100 may present visual feedback to the candidate PVD user via the display 155 that the thumbprint has been successfully scanned and recorded. Moreover, certain embodiments may be present tactile feedback in addition to, or in lieu of, the visual feedback such as a vibration. With the thumbprint recorded, the method 400 may proceed to determine if the candidate PVD user associated with the recorded thumbprint is "of age" to be an authorized PVD user of the PVD 100.

Next, at action 403 the PVD 100 may present a unique QR code, or other two-dimensional bar code, via the display 155 such that the candidate PVD user may leverage the camera subsystem of a PCD 350 to read the QR code. Moreover, the PVD 100 may present an audio code in addition to, or in lieu of, the visual code. As would be understood by one of ordinary skill in the art, at action 405 the PCD 350 may leverage data represented by the QR code to open an Internet browser and direct to an address associated with the remote authentication server 310. At action 407, the remote authentication server 407 may request a "selfie" picture of the candidate PVD user. Using the PCD 350, at action 409 the candidate PVD user may provide a "selfie" picture to the remote authentication server 310. Notably, the "selfie" picture may be in the form of a photo burst comprising a plurality of pictures taken in a quick sequence, or may be in the form of a video. Advantageously, by using videos or photo bursts, certain embodiments may recognize and guard against the candidate user trying to "trick" the provisioning process by taking a picture of a picture (of somebody else).

At action 411, the remote authentication server 310 may use the "selfie" picture to determine if the candidate PVD user is of a legal age to use the PVD 100. As previously described, the remote authentication server 310 may leverage AI to determine if, with a high likelihood, the candidate PVD user is above a predetermined age that well exceeds the legal age to use the PVD 100. For example, if the legal age to use a PVD 100 is set at twenty-one years of age, the remote authentication server 310 may apply AI algorithms to determine with a high likelihood that the candidate PVD user is at least twenty-nine years of age and, if so, then move forward to action 419 to authenticate the candidate PVD user without further age analysis or verification. The use of artificial intelligence to determine from a picture the likely age of a person in the picture, with some degree of certainty, will be understood by those of ordinary skill in the art of artificial intelligence.

If at action 411 the remote authentication server 310 is unable to determine with a degree of certainty using AI that the candidate PVD user presented in the "selfie" pic of action 409 is above a legal age to use the PVD 100, the method 400 may proceed to action 413 where the remote authentication server 310 requests a picture/scan of a government issued ID associated with the candidate PVD user. At action 415, using the PCD 350, the candidate PVD user may provide the server 310 with a picture of a valid government issued ID. The remote authentication server 310 may be operable and configured to evaluate the scan of the government issued ID to determine if the ID is valid. If the remote authentication server 310 determines that the ID is not valid, the method 400 may end and the candidate PVD user not authorized to use the PVD 100.

Using the scan of the government issued ID, at action 417 the remote authorization server 310 may compare the previously provided "selfie" picture (from action 409) to the picture of the government issued ID to determine if the candidate PVD user is one and the same as the person represented by the government issued ID. If the remote authentication server 310 determines that the person represented by the government issued ID is not one and the same as the candidate PVD user, the method 400 may terminate the candidate PVD user not authorized to use the PVD 100. If the government issued ID is determined to be a valid government issued ID associated with the candidate PVD user, the remote authentication server may verify the age of the candidate PVD user from data provided by the government issued ID. To do so, some embodiments of the solution may simply read the age data from the scan of the government issued ID, while other embodiments may communicate with a third-party data provider, such as the Department of Motor Vehicles, to verify the validity of the government issued ID and the data associated with it.

With the age of the candidate PVD user verified and determined to meet or exceed a minimum legal age, the method 400 advances to action 419 where the remote authorization server requests a second "selfie," this time capturing the candidate PVD user holding the PVD 100 with a thumb on the thumbprint reader 118 and with his mouth on the mouthpiece 160, as if using the PVD 100. As before, depending on embodiment, the "selfie" picture may actually be a burst of sequential pictures or in the form of a video. While the PCD 350 is used to take the second selfie at action 425, the PVD 100 may generate a BIA circuit at action 421 and measure a BIA signature associated with the candidate PVD user at action 423. The BIA signature uniquely associated with the candidate PVD user may be stored in the memory 112 in association with the thumbprint data initially taken at action 401, to create an authorized user identity data combination at action 433. At action 427, the remote authentication server 310 leverages the previously gathered data to determine that the candidate PVD user in the second "selfie" is the same user as previously determined to be of a sufficient age to legally use the PVD 100, after which at actions 429 and 431 the remote authentication server 310 instructs the PVD 100 to configure itself for vaporization of e-juice in response to recognition of the identity data combination of the candidate PVD user. Once the PVD 100 is so configured, the candidate PVD user becomes an authorized PVD user and can, advantageously, use the PVD 100 by placing his thumb on the thumbprint reader 118 and mouth on the mouthpiece 160 such that a BIA signature associated with the thumbprint is generated.

Returning briefly to steps 419/421 and 429/431, the remote authentication server 310 essentially communicates with the PVD 100 through the PCD 350 which provides a communication link or conduit to the PVD 100. In certain embodiments, the server 310 may communicate through network 391 directly with the PVD 100 during the provisioning process or, in some embodiments, after the provisioning process such as when pushing over-the-air updates to the PVD 100. In the exemplary embodiment shown and described relative to the various figures, however, the PCD 350 may pass on the communication to the PVD 100 using an audio signal that is received by the PVD 100 through a microphone component (not depicted in the figures, but understood by those of skill in the art of personal electronic devices). In such an embodiment, the authenticator engine 114 may be operable to decode the audio signal for instructions to advance the configuration. Notably, depending on embodiment, the PCD 350 may communicate instructions to the PVD 100 using any suitable communication mode or protocol in addition to or in lieu of the audio signal such as, but not limited to, Bluetooth shortwave radio, visual QR codes, WiFi protocols, etc.

Figure 5A:
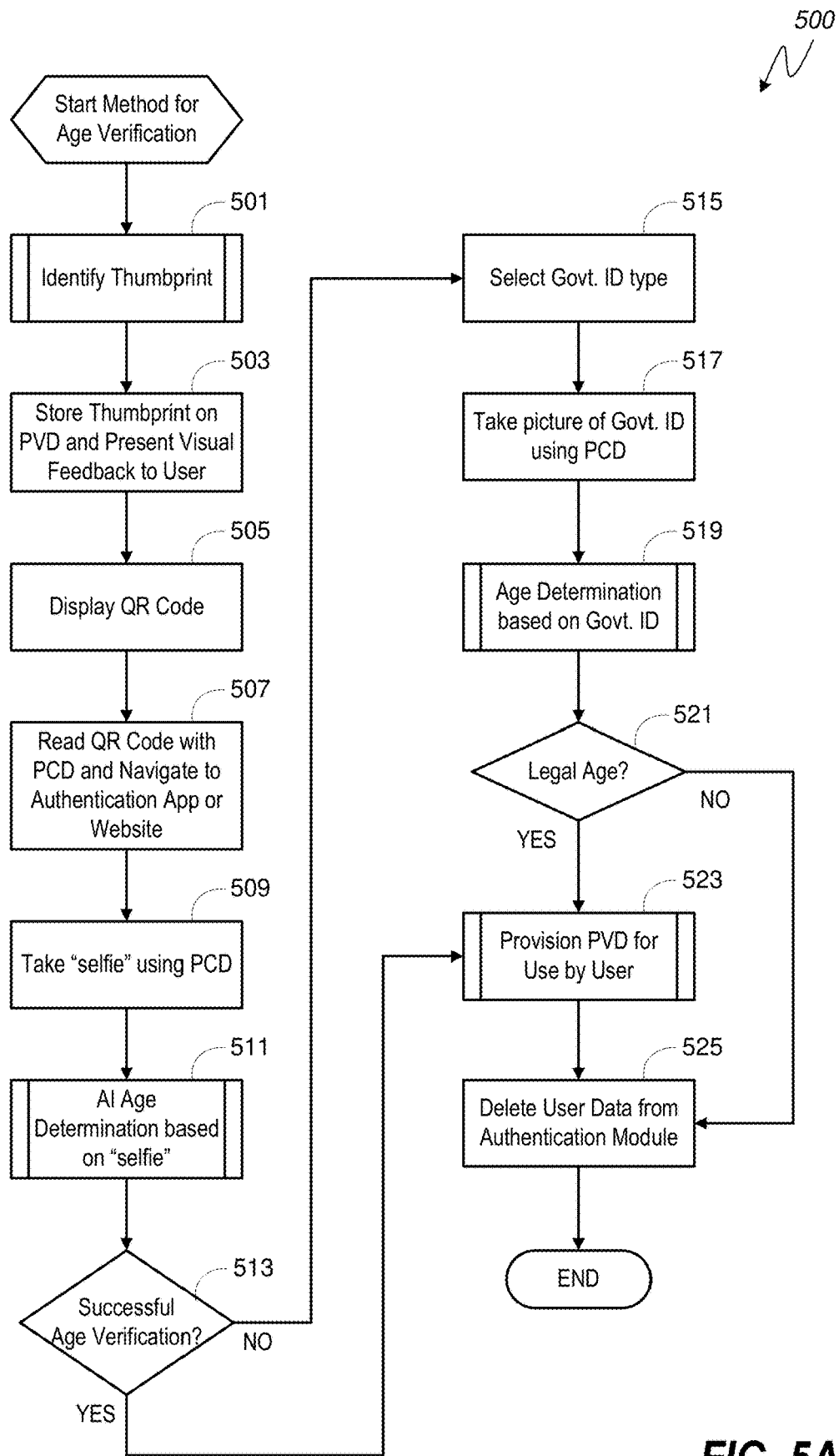
FIGS. 5A and 5B are a flow chart illustrating an exemplary method for verifying the age of a PVD user and configuring the PVD for age authenticated vaping.
Figure 5B:
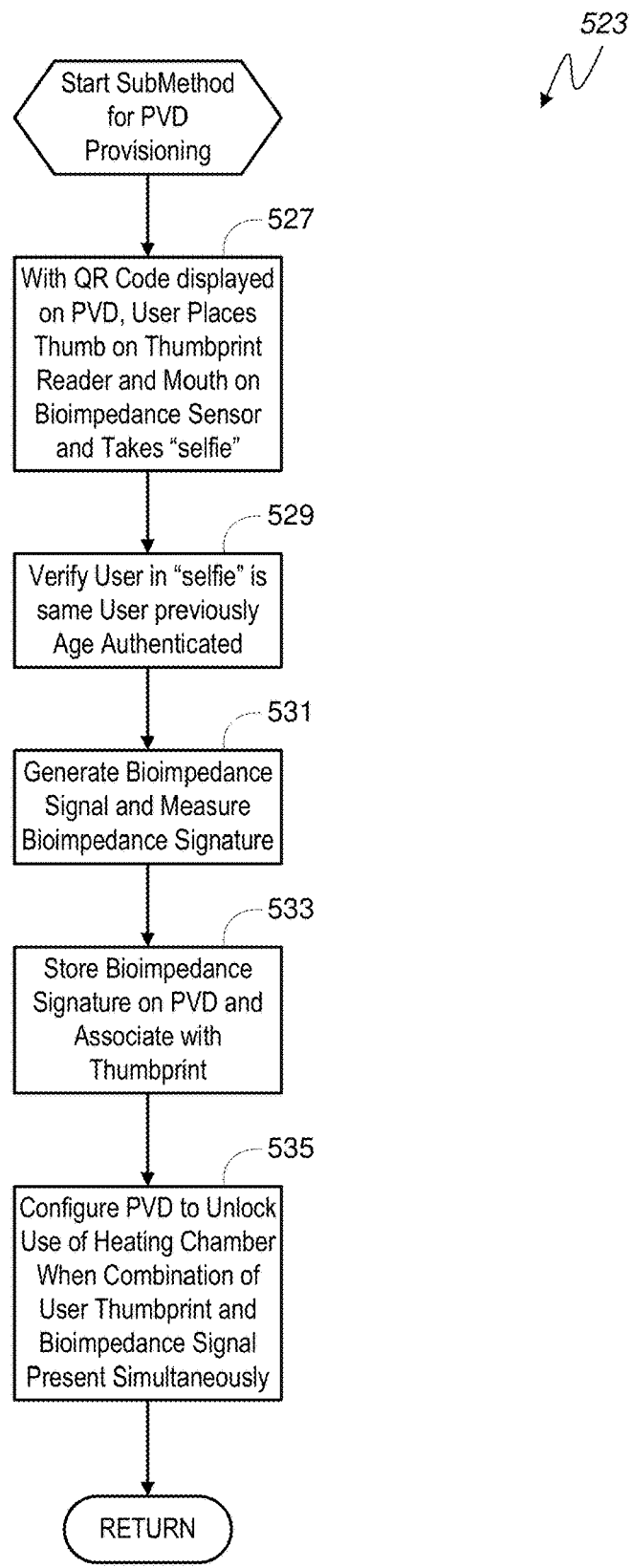

FIGS. 5A and 5B are a flow chart illustrating an exemplary method 500 for verifying the age of a PVD user and a sub-method 523 for configuring/provisioning the PVD 100 for age authenticated vaping. Beginning at process block 501, the thumbprint of a candidate PVD user is identified. Identifying the thumbprint may include digitizing the thumbprint into a binary code that is unique to the thumbprint, as would be understood by one of ordinary skill in the art of thumbprint digitization. Next, at block 503, the digitized thumbprint may be stored on the PVD 100 and visual feedback given to the candidate PVD user that the thumbprint was successfully scanned.

At block 505, the PVD 100 may display a QR code or other two-dimensional code. Next, at block 507, the QR code may be used by a PCD 350 to navigate to an internet accessible website or open an authentication app executable by the PCD 350. At block 509, the PCD 350 may be used to take a first picture of the candidate PVD user—i.e., a "selfie"—that primarily captures the face of the candidate PVD user. Then, at process block 511, using the first picture from block 509, the method 500 may leverage artificial intelligence services to determine if the candidate PVD user shown in the first picture is of an age that sufficiently exceeds a legal age for using a PVD 100. If "yes," then at decision block 513 the method 500 proceeds to process block 523. If "no," then at decision block 513 the method 500 proceeds to blocks 515 and 517 where the candidate PVD user is asked to select a type of government issued ID and provide a scan/picture of same.

Next, at process block 519, the method 500 may analyze the picture of the government issued ID to determine if it is a valid government issued ID and if it is associated with the candidate PVD user and if, according to the valid government issued ID, the candidate PVD user is of a legal age to use a PVD 100. If "no," then at decision block 521, the method 500 proceeds to block 525 where the gathered information is deleted, the PVD 100 is not configured to work for the candidate PVD user (i.e., the candidate PVD user is not authorized to use the PVD 100), and the method 500 ends. If "yes" at decision block 521, the method 500 proceeds to process block 523 where the PVD 100 is provisioned to work for the candidate PVD user—i.e., the candidate PVD user is identified to the PVD 100 to be an authorized PVD user such that the PVD 100 is configured to vaporize e-juice when used by the user.

Returning to process block 523, the various steps comprised within the process block are illustrated in FIG. 5B. Beginning at block 527, the second "selfie" previously described relative to the FIG. 4 sequence illustration is taken by the candidate PVD user. In this second "selfie" picture, the candidate PVD user is shown holding the PVD 100 as if using the device (with thumb on thumbprint reader 118/BIA sensor 158 and mouth on mouthpiece 160/BIA sensor 157). Depending on embodiment, it may also be necessary that the face of the candidate PVD user be shown unobstructed in this second "selfie" picture. At block 529, it may be verified that the person appearing in the second "selfie" from block 527 is the same person previously determined to be of a sufficient legal age for use of a PVD 100. Next, or perhaps simultaneously, at block 531, while the candidate PVD user is holding the PVD 100 with a thumb on the reader 118 and mouth on the mouthpiece 160, a bioimpedance signature may be measured. With a thumbprint recorded and a bioimpedance signature measured for a candidate PVD user who is of a legal age to use the PVD 100, at block 533 the combination of the thumbprint and bioimpedance signature may be stored as an identity data combination for a user who is authorized to use the PVD 100.

Finally, at block 535, the PVD 100 may be configured such that when the identity data combination associated with the PVD user is recognized the heating chamber/coil 119 is unlocked for vaporizing e-juice. Unlocking the heating chamber/coil 119 may include embedding instructions to the PMIC 187 to supply power to the coil 119 when the identity data combination is recognized by the PVD 100.

Figure 5C:
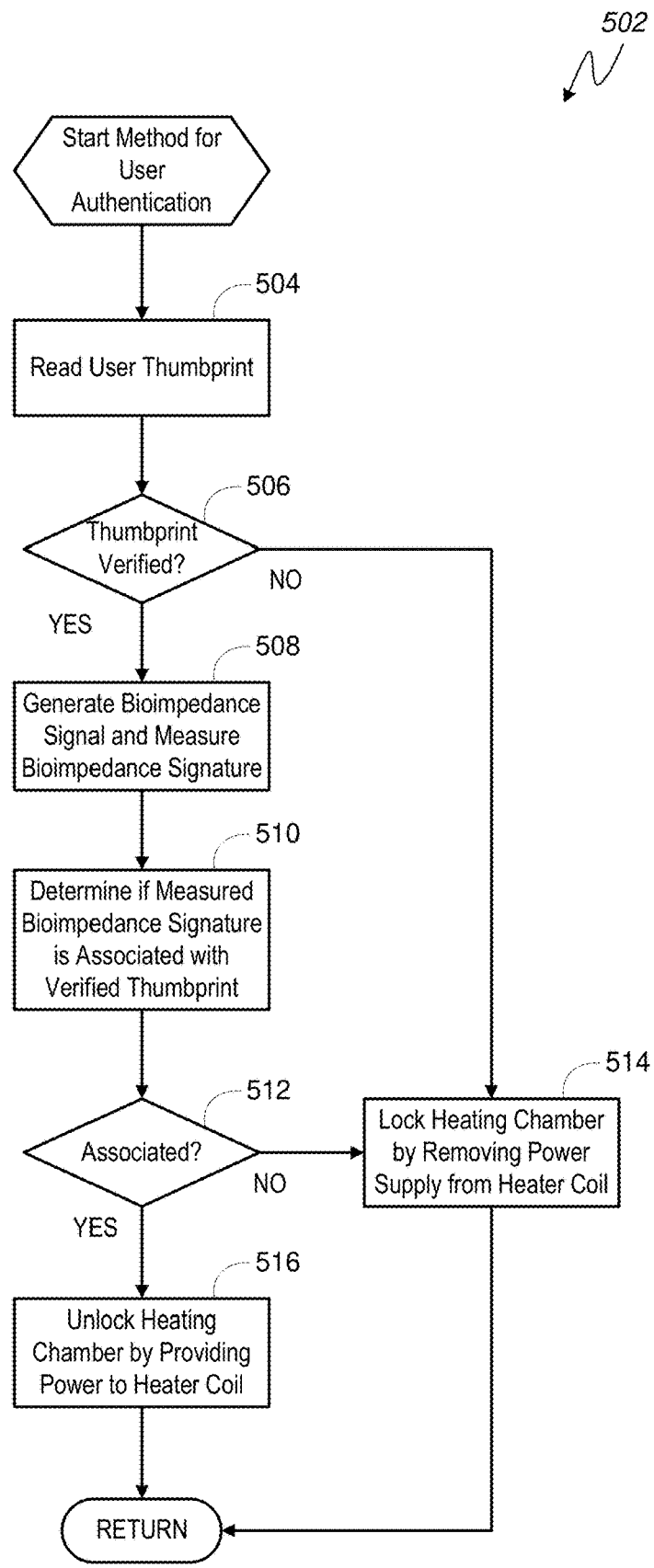
FIG. 5C is a flow chart illustrating an exemplary method for verifying the identity of a PVD user before vaporizing e-juice.

FIG. 5C is a flow chart illustrating an exemplary method 502 for verifying the identity of a PVD user as an authorized PVD user before unlocking itself to provide power to the coil 119 to vaporize e-juice. Beginning at block 504, using the thumbprint reader 118, the authenticator engine 114 may read the active PVD user's thumbprint and compare it to thumbprints stored in memory 112. Next, at decision block 506, if the thumbprint of the active PVD user is not a match with any thumbprint stored in memory 112, the method 502 advances to block 514 and the heating chamber is "locked" such that no power is supplied to the coil 119. If the thumbprint is verified to match a thumbprint stored in memory 112, the method 502 advances from decision block 506 to block 508 where a BIA circuit is generated by the bioimpedance generator 115 to send a weak voltage through the active PVD user's body from the BIA sensor 158 (associated with the thumbprint reader 118) to the BIA sensor 157 (associated with the mouthpiece 160). With the BIA circuit complete, the authenticator engine 114, working with the bioimpedance generator 115, reads the bioimpedance signature. At block 510, the memory 112 is queried to determine if the bioimpedance signature measured at block 508 is associated with the verified thumbprint from blocks 504, 506. If the bioimpedance signature is associated with the verified thumbprint, a valid identity data combination is recognized at decision block 512 and the method 502 advances to block 516 where the heating chamber is "unlocked" such that power is supplied to the coil 119 for vaporization of e-juice. If the identity data combination is not recognized, it is concluded that the active PVD user is not an authorized PVD user and the method 502 advances from decision block 512 to block 514 where no power is supplied to the coil 119—i.e., the heating chamber is "locked."

Figure 6A:
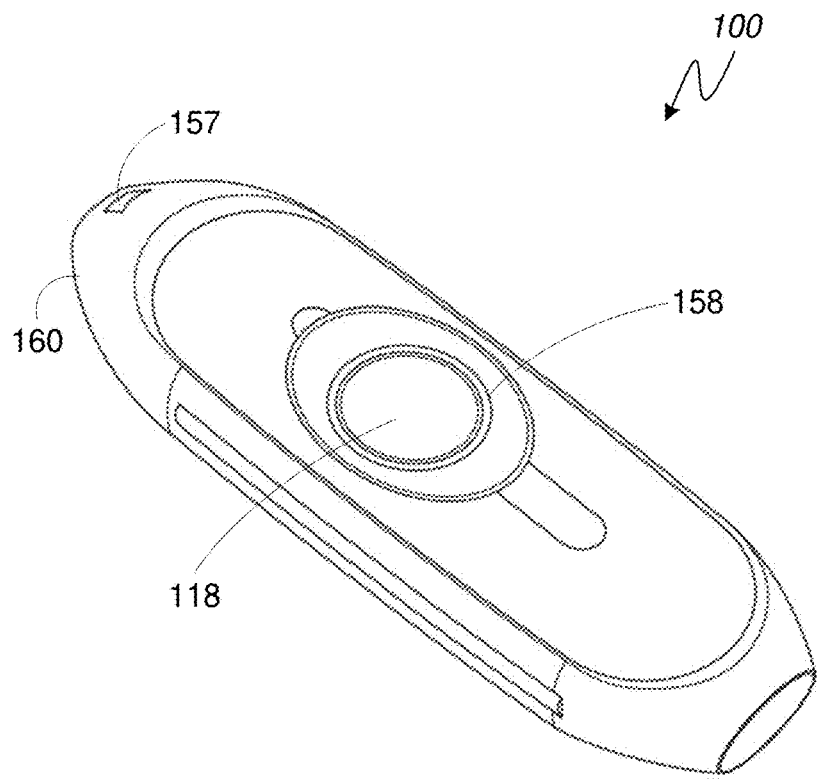
FIGS. 6A through 6L provide detailed illustrations of an exemplary PVD user experience when provisioning/configuring the PVD according to the exemplary method of FIGS. 5A and 5B.
Figure 6A:
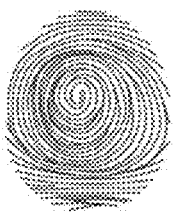
Figure 6A:
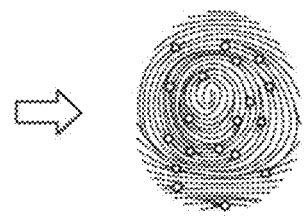
Figure 6A:
Figure 6B:
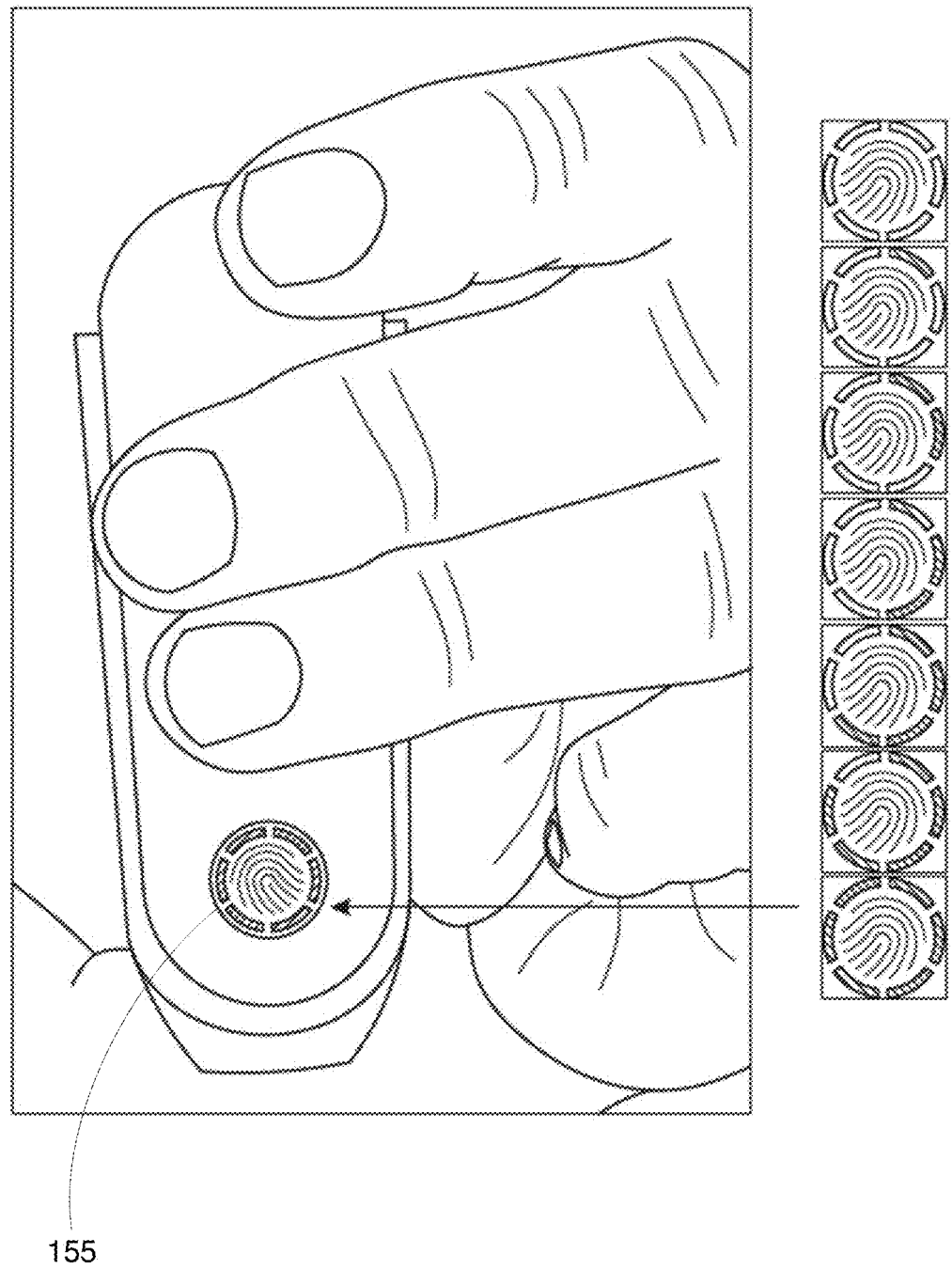

FIGS. 6A through 6L provide detailed illustrations of an exemplary PVD user experience when provisioning/configuring the PVD 100 according to the exemplary method of FIGS. 5A and 5B (and sequence illustration FIG. 4). Beginning with the FIG. 6A illustration, when an active PVD user places a thumb on the reader 118, a digital image of the user's thumbprint may be scanned and its unique pattern digitized into a binary code that is stored in memory 112 of the PVD 100. The FIG. 6B illustration demonstrates visual feedback that the active PVD user may receive as a result of placing a thumb on reader 118. As can be understood from the FIG. 6B illustration, the display 155 may give a sequenced display as the thumbprint reading process continues, to show the active PVD user that the thumbprint is in the process of being scanned. Once scanning is complete and successful, the final visual feedback may show "green" or some other indicator that the scan is complete. As would be understood by one of ordinary skill in the art of thumbprint scanning, the active PVD user may be required to sequentially lift and place the thumb multiple times in order to complete the scan and produce a statistically accurate digitization.

Figure 6C:
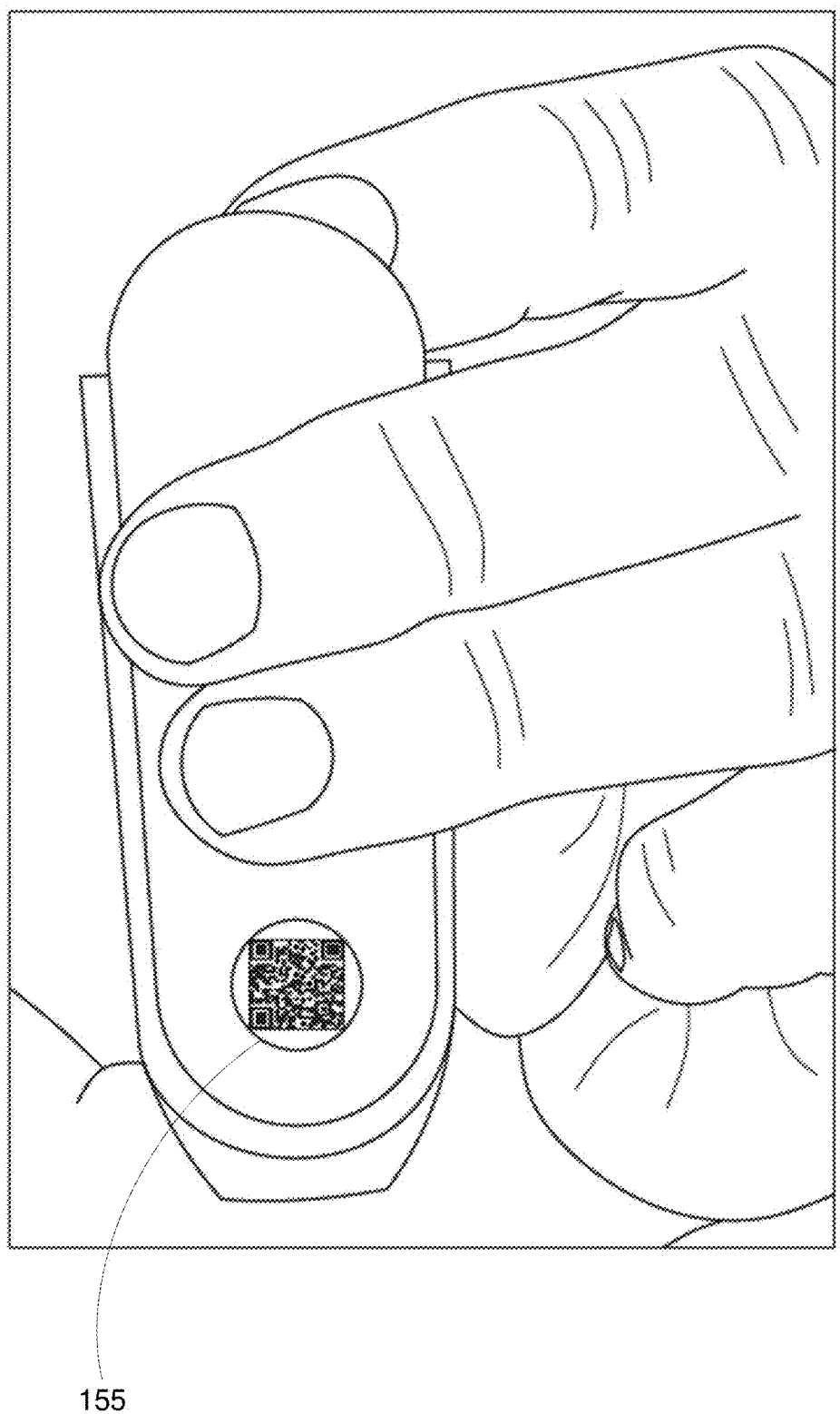
Figure 6D:
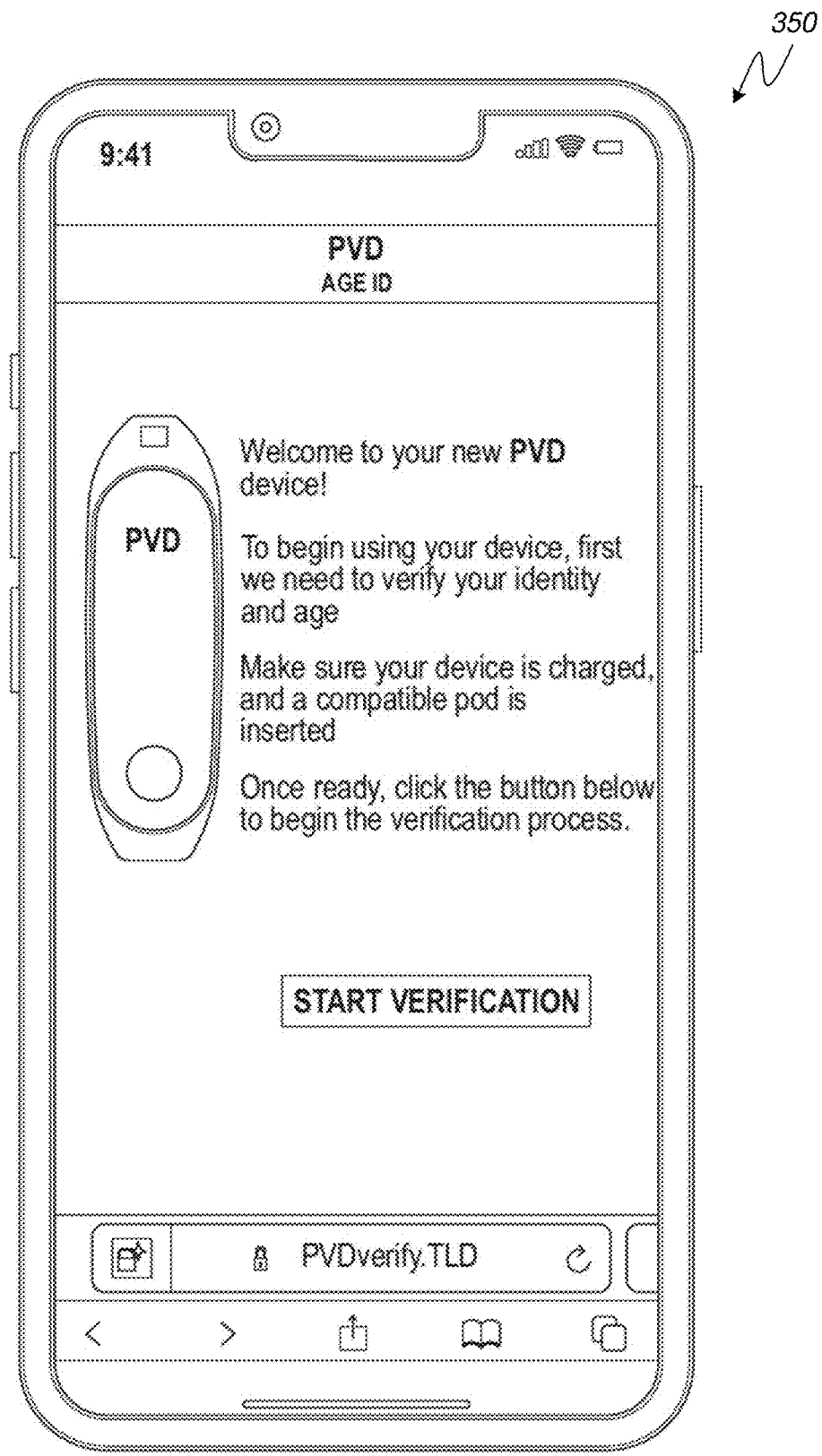

With the thumbprint scanned and successfully digitized, the display 155 may present a QR code, as shown in the FIG. 6C illustration. The QR code may be used by a PCD 350 to navigate to a website or launch an app, as the case may be, in order to interface with the remote authentication server 310. The illustration of FIG. 6D demonstrates an exemplary user interface for beginning the age verification process of a candidate PVD user. As can be seen in the FIG. 6D illustration, the candidate PVD user is prompted to start the verification process by actuating the "start verification" button.

Figure 6E:
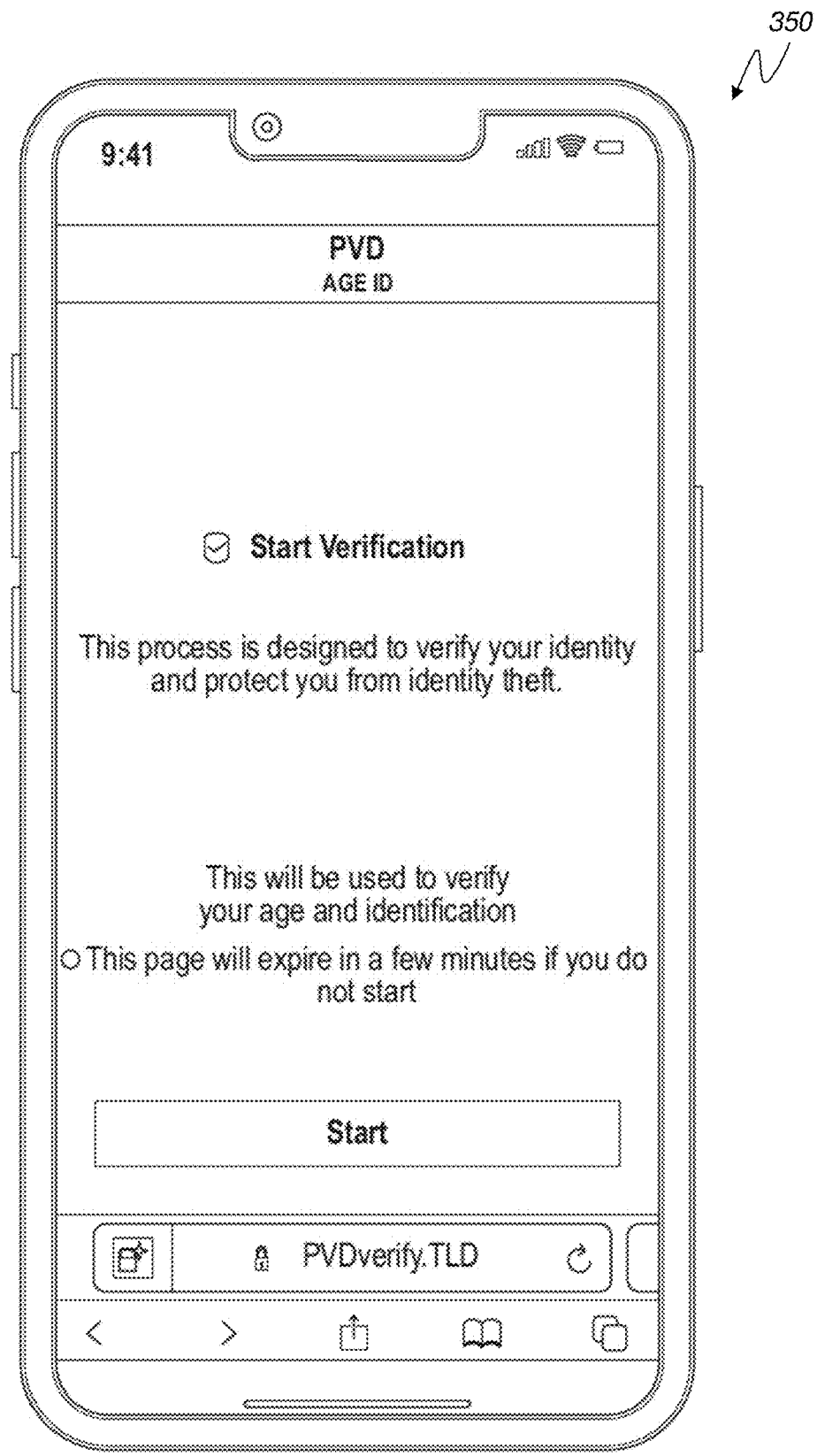
Figure 6F:
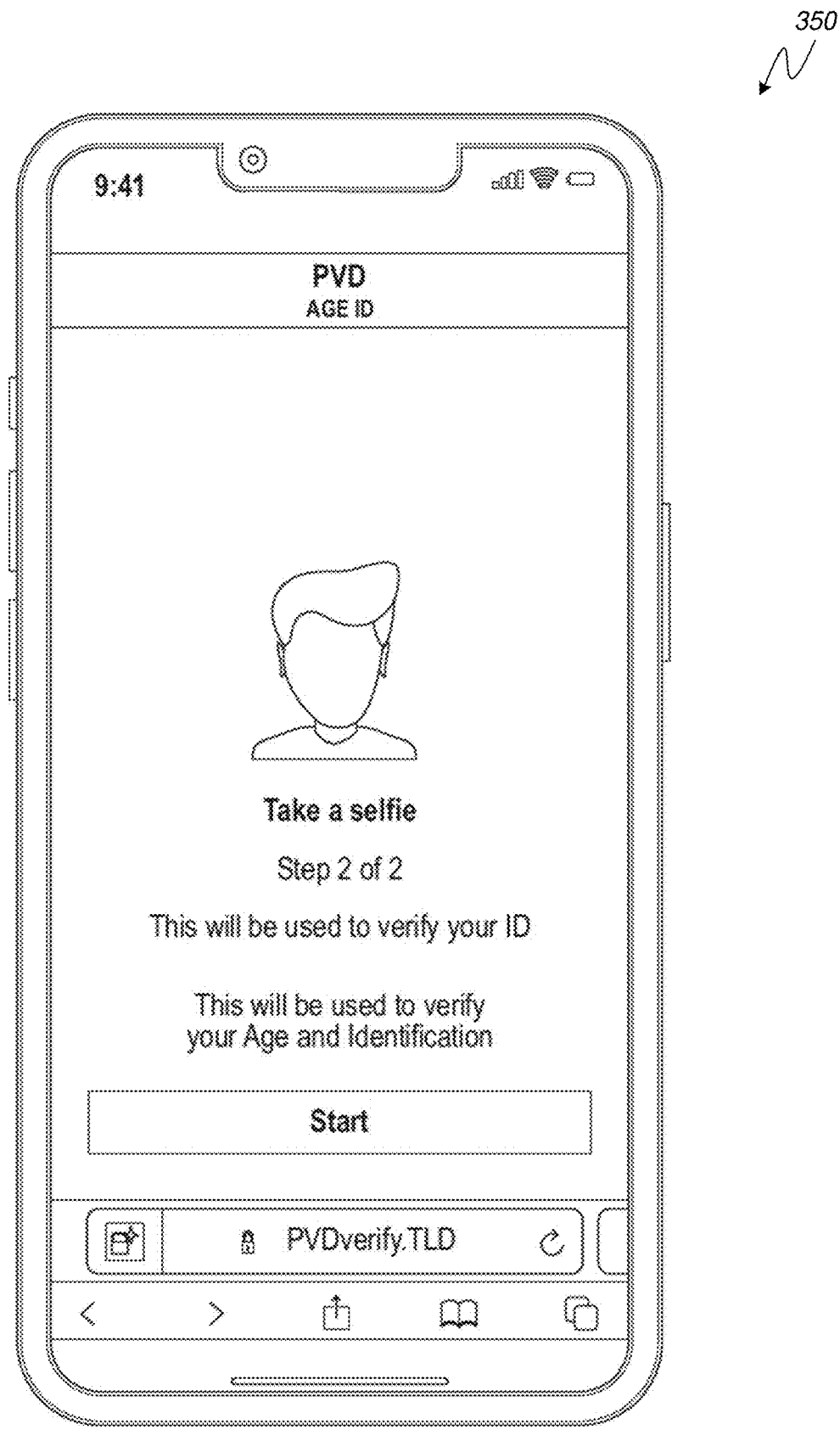
Figure 6G:
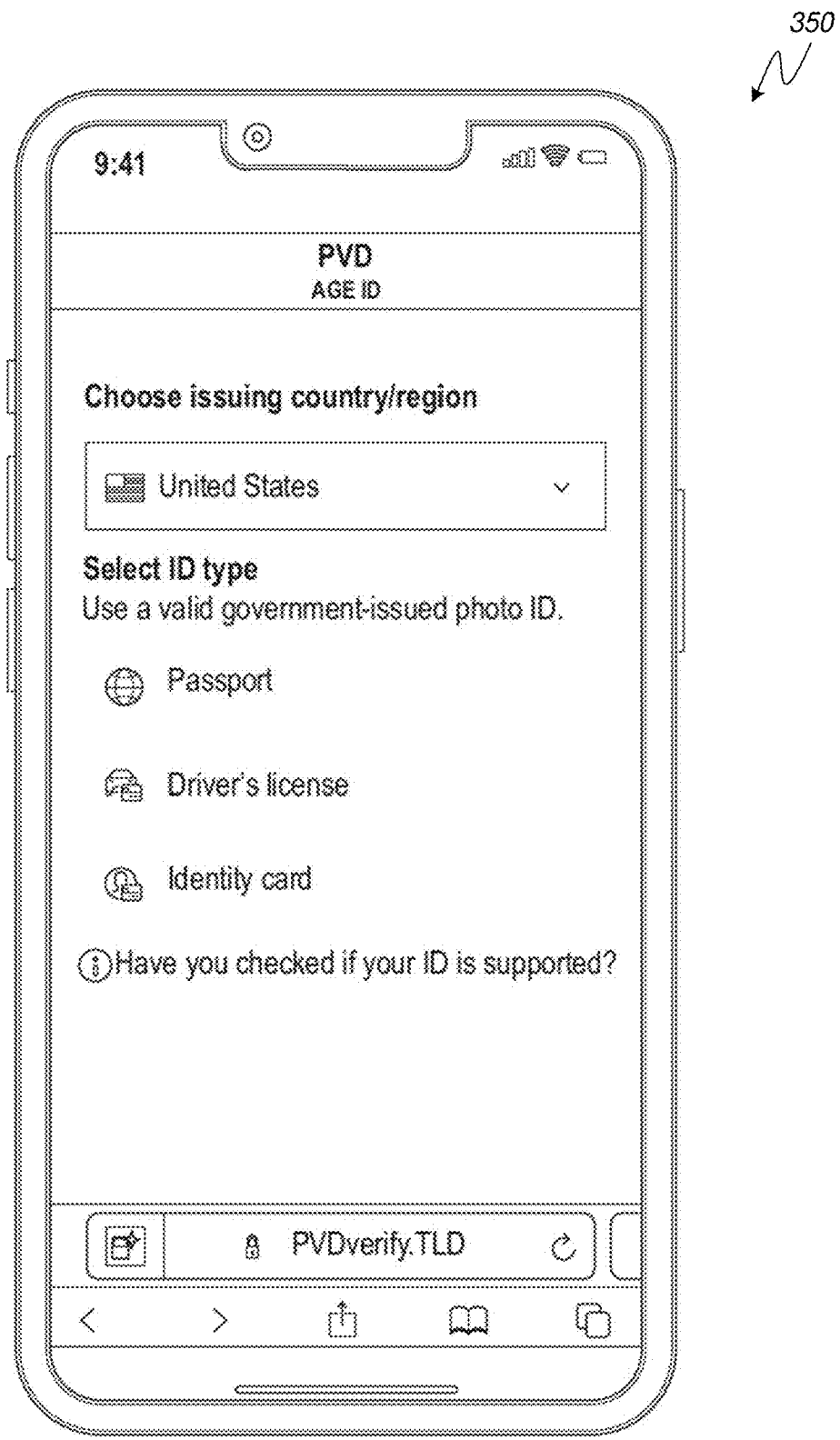
Figure 6H:
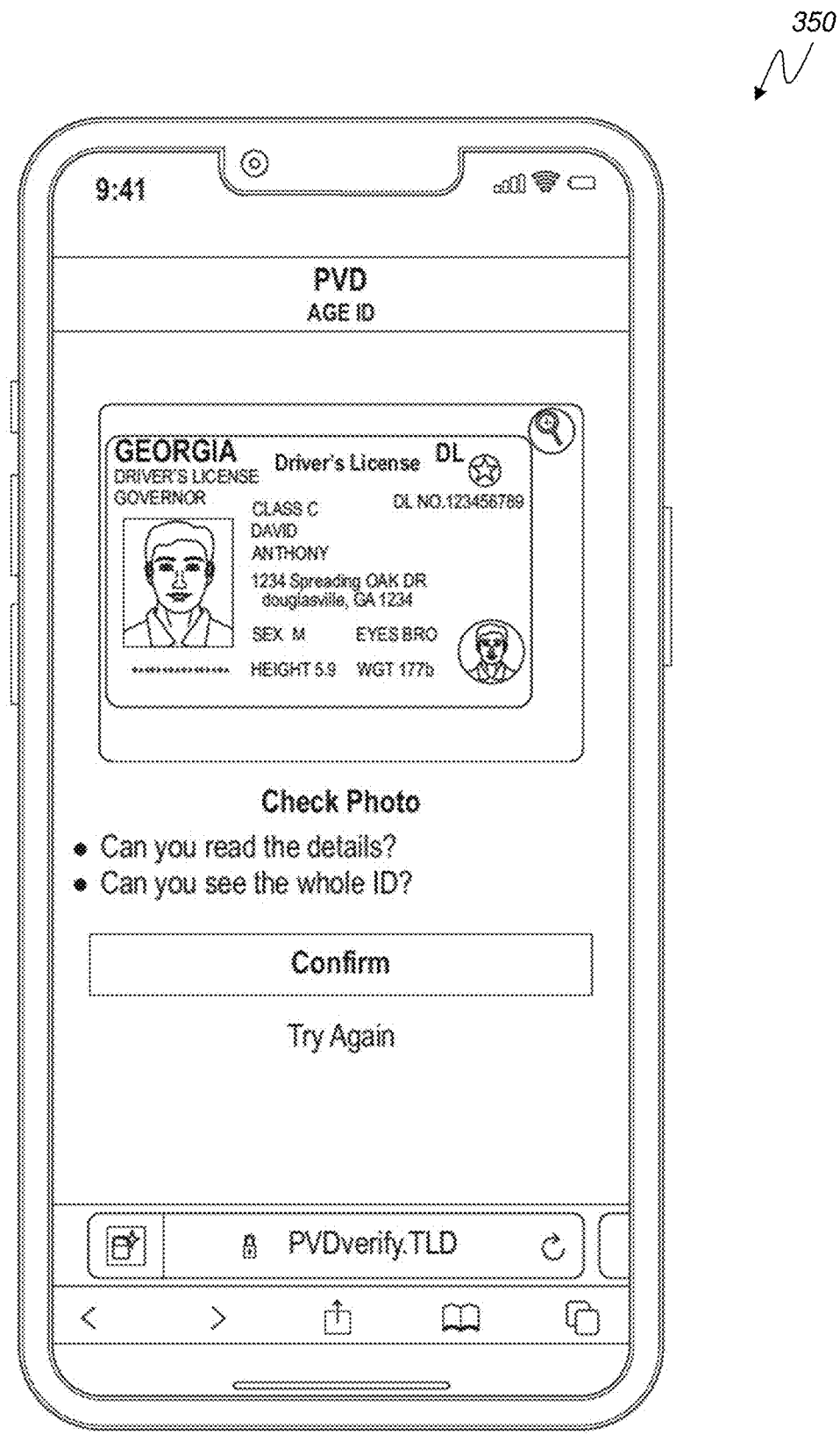
Figure 6I:
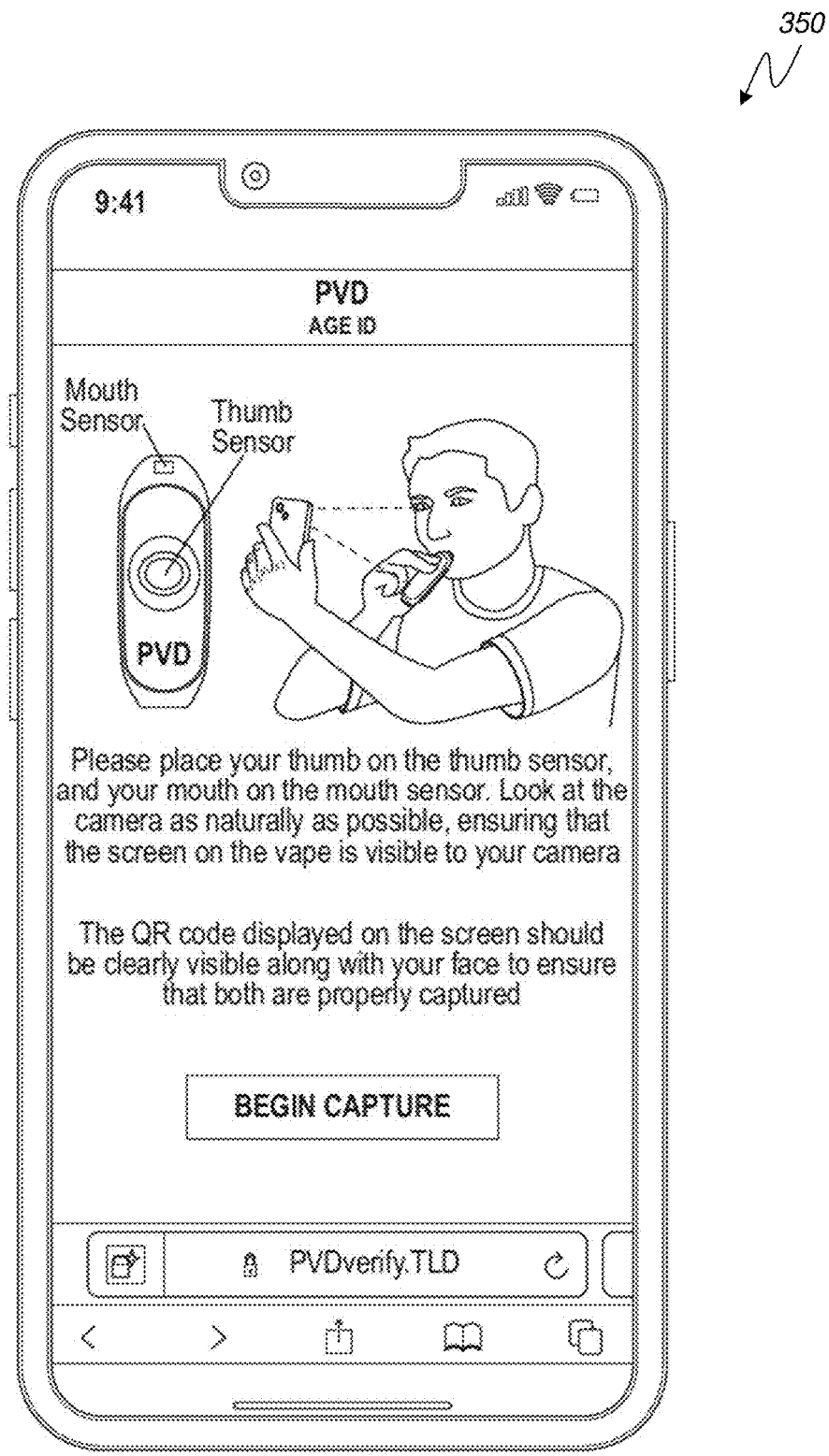
Figure 6J:
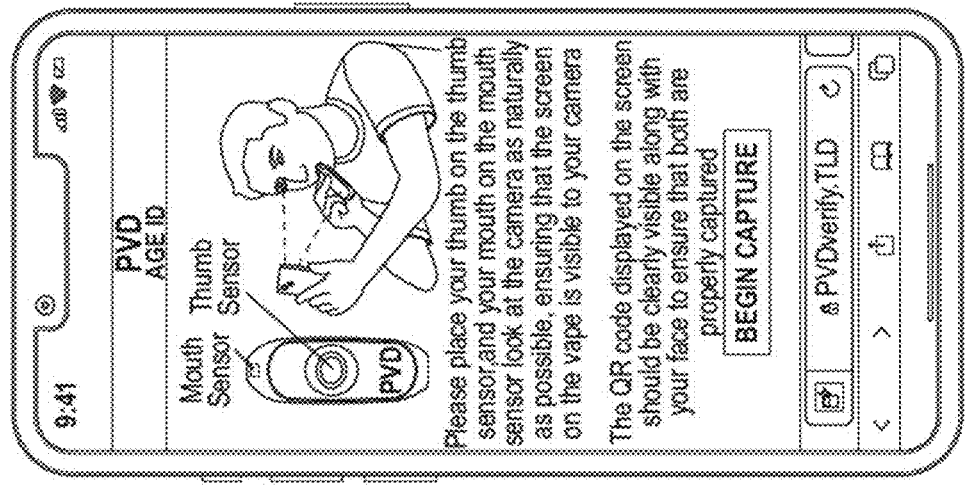
Figure 6K:
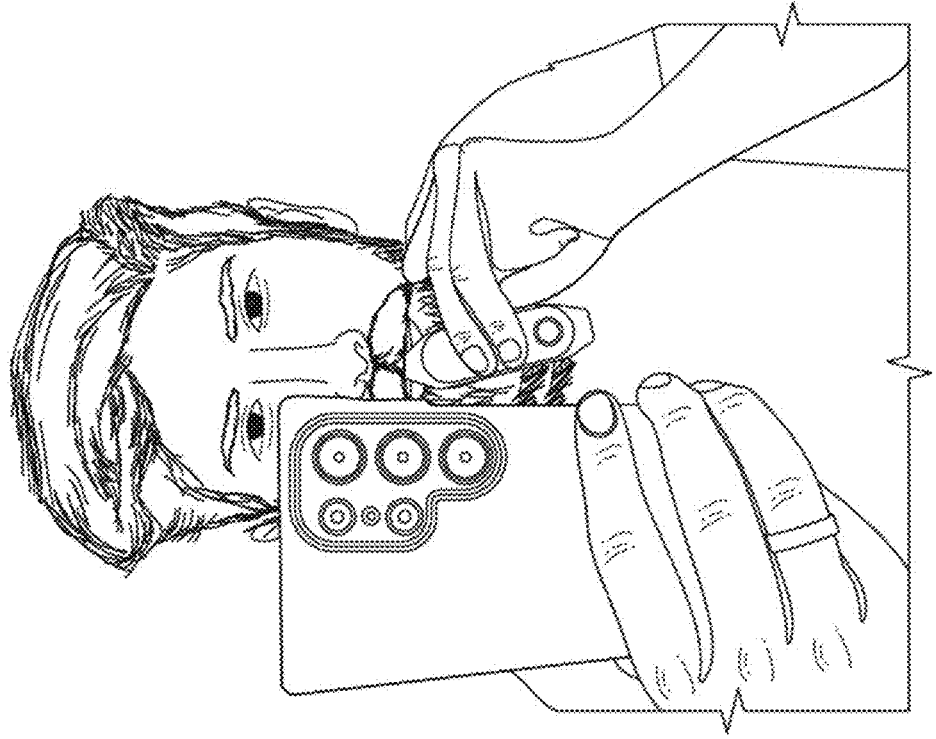
Figure 6L:
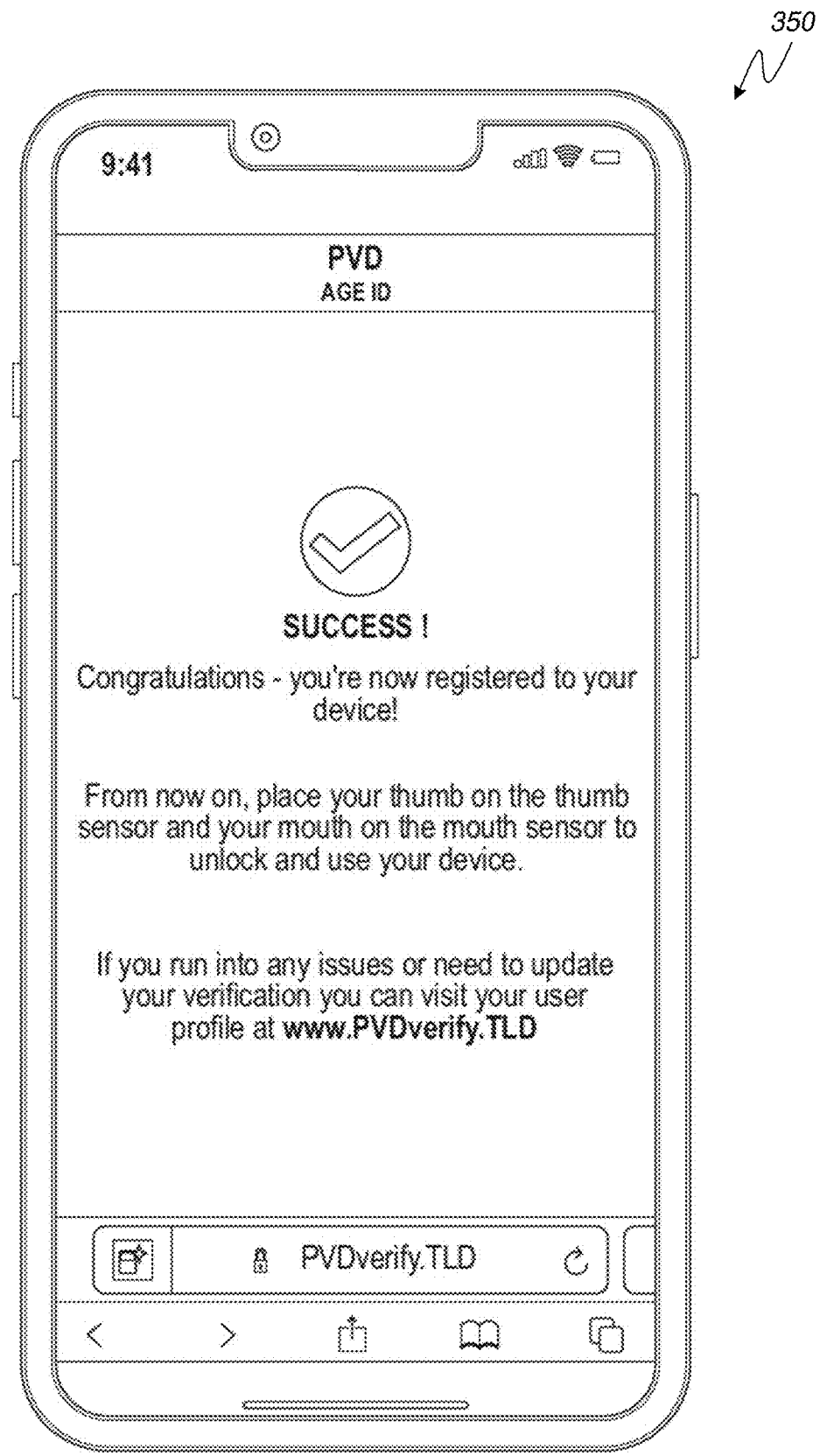

The exemplary user experience for provisioning/configuring a PVD 100 for age authenticated vaping continues at FIG. 6E. As can be understood from the FIG. 6E illustration, the candidate PVD user is educated on the need for the process and prompted to proactively begin the age verification process. Next, as can be understood from the FIG. 6F illustration, the candidate PVD user is prompted to take a "selfie" primarily consisting of the face of the candidate PVD user. As explained above, the remote authentication server 310 may be operable to determine that the age of a candidate PVD user exceeds a legal age for use of a PVD 100 by leveraging artificial intelligence algorithms to analyze the selfie. If not, the exemplary user experience for provisioning/configuring a PVD 100 for age authenticated vaping may continue at FIG. 6G where the candidate PVD user is asked to select a type of government issued identification and, as shown in FIG. 6H, scan the user's instance of that type of identification for upload to the remote authentication server 310. As would be understood by one of ordinary skill in the art of PCDs 350 and their camera subsystems, a government ID may be "scanned" by taking a picture of the ID.

The system may use the scan of the government issued ID to determine if the candidate PVD user presented in the previous selfie is the same person identified by the government issued ID and if the government issued ID identifies the person to be of a legal age for using a PVD 100. Next, the user experience for provisioning/configuring a PVD 100 for age authenticated vaping continues to FIGS. 6I, 6J, and 6K where the candidate PVD user is asked to take a second "selfie"—this time, capturing his face with his thumb on the thumbprint reader 118 of the PVD 100 and the mouthpiece 160 of the PVD 100 to his lips. With this second capture, the system may verify that the person in the second "selfie" is the same person associated with the previously acquired thumbprint. The system may then also measure a BIA signature, as previously described, and associate that BIA signature with the thumbprint to form an authorized identity data combination. The illustration of FIG. 6K demonstrates a candidate PVD user acting according to the instructions provided by the user experience of FIGS. 6I and 6J. Finally, FIG. 6L completes the user experience for provisioning/configuring a PVD 100 for age authenticated vaping, showing the candidate PVD user that the age verification process is complete and that he is now an authorized PVD user for the PVD 100.

Figure 7A:
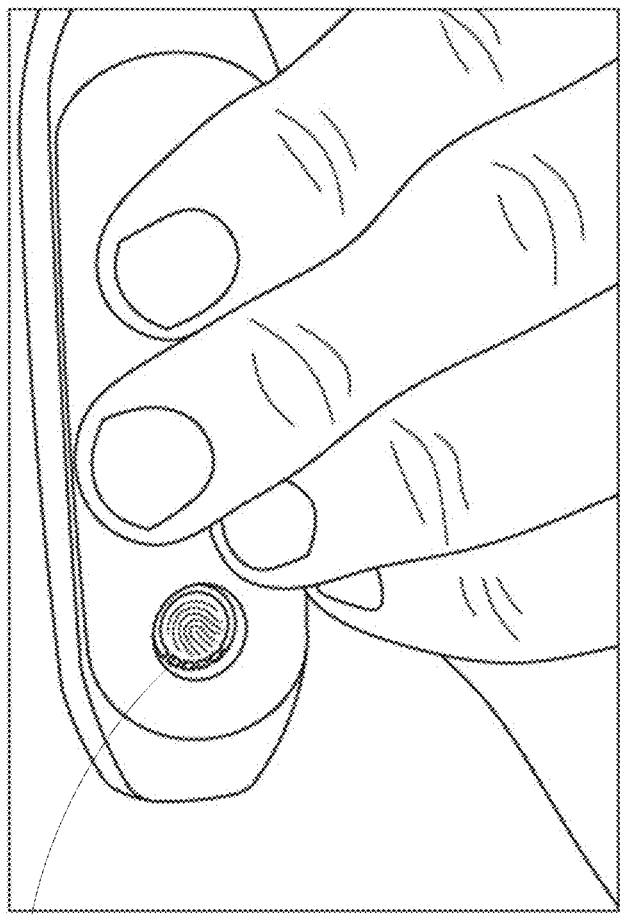
FIGS. 7A and 7B illustrate an exemplary PVD user experience when using a PVD previously provisioned/configured according to the exemplary method of FIGS. 5 and 5B.
Figure 7A:
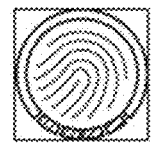
Figure 7A:
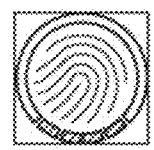
Figure 7B:

FIGS. 7A and 7B illustrate an exemplary PVD user experience when using a PVD 100 previously provisioned/configured according to the exemplary method of FIGS. 5 and 5B. As can be understood from the FIG. 7A illustration, the active PVD user, upon placing his thumb on the thumbprint reader 118, will have his thumbprint scanned and compare to thumbprints stored in memory 112 of the PVD 100. If the thumbprint of the active user matches the thumbprint of an authorized user stored in memory 112, the PVD 100 may give a "positive" visual feedback to the active PCD user, such as a "green" thumbprint or the like presented by display 155. Similarly, if the thumbprint of the active user does not match the thumbprint of an authorized user stored in memory 112, the PVD 100 may give a "negative" visual feedback to the active PCD user, such as a "red" thumbprint or the like presented by display 155. Moreover, certain embodiments may be present tactile feedback in addition to, or in lieu of, the visual feedback such as a vibration or series of vibrations. If the thumbprint is not recognized, the PVD 100 will not be operable to vaporize e-juice, as previously described.

If the thumbprint matches an authorized thumbprint, a BIA signature is measured when the active PVD user places the PVD 100 to his mouth, as previously described. If the measured BIA signature is associated with the authorized thumbprint, the PVD 100 concludes that the active PVD user is an authorized user and allows the user to vape. FIG. 7B illustrates use of the PVD 100 by an authorized PVD user according to the solution.

Systems, devices and methods for age authenticated vaping have been described using detailed descriptions of embodiments thereof that are provided by way of example and are not intended to limit the scope of the disclosure. The described embodiments comprise different features, not all of which are required in all embodiments of age authenticated vaping systems according to the solution. Some embodiments of age authenticated vaping systems utilize only some of the features or possible combinations of the features described and/or illustrated herein. Variations of embodiments of age authenticated vaping systems that are described and embodiments comprising different combinations of features noted in the described embodiments will occur to persons of skill in the art.

What is claimed is:

1. A method for age authenticated vaping, comprising:
   simultaneously reading a thumbprint and measuring a bioimpedance signature, wherein the thumbprint and bioimpedance signature define an identity data combination for an active user of a vaping device;
   based on the identity data combination for the active user of the vaping device, determining that the active user is an authorized user of the vaping device; and
   unlocking the vaping device such that power is supplied to a coil operable to vaporize e-juice;
   wherein the vaping device comprises a first bioimpedance sensor associated with a mouthpiece of the vaping device, a thumbprint reader, and a second bioimpedance sensor associated with the thumbprint reader, such that, when the active user places a lip on the mouthpiece and a thumb on the thumbprint reader, a bioimpedance circuit is generated between the first and second bioimpedance sensors; and
   wherein the vaping device remains unlocked so long as the lip of the user remains on the mouthpiece and the thumb of the user remains on the thumb print reader.

2. The method of claim 1, wherein determining that the active user of the vaping device is an authorized user of the vaping device comprises comparing the identity data combination of the active user with one or more stored identity data combinations associated with authorized users of the vaping device.

3. The method of claim 2, further comprising calculating that, within a statistical confidence interval, the identity data combination of the active user is equivalent to one of the one or more stored identity combinations associated with authorized users of the vaping device.

4. The method of claim 1, wherein there are a plurality of authorized users of the vaping device and each authorized user is associated with a unique identity data combination.

5. The method of claim 1, further comprising:
   based on the identity data combination of the active user, updating a bioimpedance signature stored in association with an authorized user.

6. The method of claim 1, further comprising providing visual feedback to the active user of the vaping device that the thumbprint has been successfully read.

7. A vaping device for age authenticated vaping, comprising:
   a heating coil operable to vaporize e-juice;
   a thumbprint reader operable to read a thumbprint;
   a bioimpedance analysis subsystem comprising first and second bioimpedance sensors, the subsystem operable to measure a bioimpedance signature when a lip of an active user of the vaping device is in contact with the first of the bioimpedance sensors associated with a mouthpiece of the vaping device and a thumb of the active user is in contact with the second of the bioimpedance sensors associated with the thumb print reader; and
   an authenticator engine configured to compare an identity data combination associated with an active user of the vaping device with one or more stored identity data combinations associated with authorized users of the vaping device, wherein a thumbprint and a bioimpedance signature define an identity data combination;
   wherein the thumbprint reader reads the active user's thumbprint simultaneously with the bioimpedance analysis subsystem measuring the bioimpedance signature;
   wherein, if the authenticator engine determines that an identity data combination for an active user of the vaping device is statistically equivalent to one of the one or more identity data combinations associated with authorized users of the vaping device, the vaping device is unlocked such that power is supplied to the coil;
   wherein the vaping device remains unlocked so long as the lip of the user remains on the mouthpiece and the first bioimpedance sensor, and the thumb of the user remains on the thumb print reader and the second bioimpedance sensor.

8. The vaping device of claim 7, wherein there are a plurality of authorized users of the vaping device and each authorized user is associated with a unique identity data combination.

9. The vaping device of claim 7, wherein the authenticator engine is further configured to update a bioimpedance signature stored in association with an authorized user.

10. The vaping device of claim 7, further comprising a display component for providing visual feedback to an active user of the vaping device that a thumbprint has been successfully read.

11. A vaping device for age authenticated vaping, comprising:
    means for simultaneously reading a thumbprint and measuring a bioimpedance signature, wherein the thumbprint and bioimpedance signature define an identity data combination for an active user of a vaping device;
    based on the identity data combination for the active user of the vaping device, means for determining that the active user is an authorized user of the vaping device; and
    means for unlocking the vaping device such that power is supplied to a coil operable to vaporize e-juice;
    wherein the vaping device comprises a first bioimpedance sensor associated with a mouthpiece of the vaping device, a thumbprint reader, and a second bioimpedance sensor associated with the thumbprint reader, such that, when the active user places a lip on the mouthpiece and a thumb on the thumbprint reader, a bioimpedance circuit is generated between the first and second bioimpedance sensors; and
    wherein the vaping device remains unlocked so long as the lip of the user remains on the mouthpiece and the thumb of the user remains on the thumb print reader.

12. The vaping device of claim 11, wherein the means for determining that the active user of the vaping device is an authorized user of the vaping device further comprises means for comparing the identity data combination of the active user with one or more stored identity data combinations associated with authorized users of the vaping device.

13. The vaping device of claim 12, further comprising means for calculating that, within a statistical confidence interval, the identity data combination of the active user is equivalent to one of the one or more stored identity combinations associated with authorized users of the vaping device.

14. The vaping device of claim 11, wherein there are a plurality of authorized users of the vaping device and each authorized user is associated with a unique identity data combination.

15. The vaping device of claim 11, further comprising:
based on the identity data combination of the active user, means for updating a bioimpedance signature stored in association with an authorized user.

16. The vaping device of claim 11, further comprising means for providing visual feedback to the active user of the vaping device that the thumbprint has been successfully read.

17. A computer program product comprising a non-transitory tangible medium having a computer readable program code embodied therein, said computer readable program code adapted to be executed to implement a method for age authenticated vaping in a personal vaping device ("PVD"), said method comprising:
simultaneously reading a thumbprint and measuring a bioimpedance signature, wherein the thumbprint and bioimpedance signature define an identity data combination for an active user of a vaping device;
based on the identity data combination for the active user of the vaping device, determining that the active user is an authorized user of the vaping device; and
unlocking the vaping device such that power is supplied to a coil operable to vaporize e-juice;
wherein the vaping device comprises a first bioimpedance sensor associated with a mouthpiece of the vaping device, a thumbprint reader, and a second bioimpedance sensor associated with the thumbprint reader, such that, when the active user places a lip on the mouthpiece and a thumb on the thumbprint reader, a bioimpedance circuit is generated between the first and second bioimpedance sensors; and
wherein the vaping device remains unlocked so long as the lip of the user remains on the mouthpiece and the thumb of the user remains on the thumb print reader.

18. The computer program product of claim 17, wherein determining that the active user of the vaping device is an authorized user of the vaping device comprises comparing the identity data combination of the active user with one or more stored identity data combinations associated with authorized users of the vaping device.

19. The computer program product of claim 18, further comprising calculating that, within a statistical confidence interval, the identity data combination of the active user is equivalent to one of the one or more stored identity combinations associated with authorized users of the vaping device.

20. The computer program product of claim 17, wherein there are a plurality of authorized users of the vaping device and each authorized user is associated with a unique identity data combination.

21. The computer program product of claim 17, further comprising:
based on the identity data combination of the active user, updating a bioimpedance signature stored in association with an authorized user.

\* \* \* \* \*